(12) United States Patent
Shimazawa et al.

(10) Patent No.: US 7,911,882 B2
(45) Date of Patent: Mar. 22, 2011

(54) THIN-FILM MAGNETIC HEAD WITH NEAR-FIELD-LIGHT-GENERATING LAYER

(75) Inventors: Koji Shimazawa, Chuo-ku (JP); Katsumichi Tagami, Chuo-ku (JP)

(73) Assignee: TDK Corporation, Tokyo (JP)

(*) Notice: Subject to any disclaimer, the term of this patent is extended or adjusted under 35 U.S.C. 154(b) by 1150 days.

(21) Appl. No.: 11/604,225

(22) Filed: Nov. 27, 2006

(65) Prior Publication Data

US 2007/0139818 A1   Jun. 21, 2007

(30) Foreign Application Priority Data

Dec. 16, 2005  (JP) ................................. 2005-362940
Dec. 16, 2005  (JP) ................................. 2005-362941
Jan. 20, 2006  (JP) ................................. 2006-012323

(51) Int. Cl.
*G11B 7/125* (2006.01)
*G11B 7/135* (2006.01)
*G11B 11/10* (2006.01)
(52) U.S. Cl. ............... 369/13.33; 369/13.02; 360/59
(58) Field of Classification Search ............... 369/13.33, 369/13.02, 13.14; 360/59, 128
See application file for complete search history.

(56) References Cited

U.S. PATENT DOCUMENTS

| 7,042,810 | B2 | 5/2006 | Akiyama et al. | |
| 2003/0128452 | A1* | 7/2003 | McDaniel et al. | 360/59 |
| 2004/0062503 | A1* | 4/2004 | Challener | 385/129 |
| 2005/0024774 | A1* | 2/2005 | Fontana et al. | 360/128 |

FOREIGN PATENT DOCUMENTS

| JP | 10-162444 | | 6/1998 |
| JP | 2000-173093 | A | 6/2000 |
| JP | 2001-255254 | A | 9/2001 |
| JP | 2004-151046 | A | 5/2004 |
| JP | 2004151046 | * | 5/2004 |
| JP | 2004-158067 | A | 6/2004 |
| JP | 2005-004901 | | 1/2005 |

OTHER PUBLICATIONS

U.S. Appl. No. 11/698,145, filed Jan. 26, 2007.
S. Miyanishi et al., "Near-Field Assisted Magnetic Recording", IEEE Transactions on Magnetics, vol. 41, No. 10, Oct. 2005, pp. 2817-2821.

* cited by examiner

*Primary Examiner* — Craig A. Renner
*Assistant Examiner* — Tamara Ashford
(74) *Attorney, Agent, or Firm* — Frommer Lawrence & Haug LLP

(57) ABSTRACT

A thin-film magnetic head that has a configuration in which the element-formed surface and the opposed-to-medium surface are perpendicular to each other, and a light source is sufficiently distanced from the medium surface is provided. The head comprises at least one near-field-light-generating layer for heating a part of a magnetic medium during write operation by generating a near-field light, having a shape tapered toward a head end surface on the opposed-to-medium surface side, and comprising a near-field-light-generating portion having a light-received surface and a tip reaching the head end surface on the opposed-to-medium surface side, and the light-received surface being sloped in respect to the element-formed surface and being provided in a position where an incident light propagating from a head end surface opposite to the opposed-to-medium surface can reach at least a part of the light-received surface.

45 Claims, 16 Drawing Sheets

THIN-FILM MAGNETIC HEAD WITH NEAR-FIELD-LIGHT-GENERATING LAYER

PRIORITY CLAIM

This application claims priorities from Japanese patent application No. 2005-362940, filed on Dec. 16, 2005, Japanese patent application No. 2005-362941, filed on Dec. 16, 2005 and Japanese patent application No. 2006-12323, filed on Jan. 20, 2006, which are incorporated herein by reference.

BACKGROUND OF THE INVENTION

1. Field of the Invention

The present invention relates to a thin-film magnetic head that reads and writes data signals, a head gimbal assembly (HGA) with the thin-film magnetic head and a magnetic disk drive apparatus with the HGA. Especially, the present invention relates to a thin-film magnetic head that writes data signals by a heat-assisted magnetic recording technique using a near-field light, an HGA with the thin-film magnetic head and a magnetic disk drive apparatus with the HGA.

2. Description of the Related Art

Recently, in a magnetic recording apparatus such as a magnetic disk drive apparatus, because its recording density becomes higher due to the spread use of data with larger volume, the thin-film magnetic head is strongly required to further improve its performance. As the thin-film magnetic head, a composite-type thin-film magnetic head is widely used, which has a stacked structure of a magnetoresistive (MR) effect element for reading data signals from a magnetic recording medium such as a magnetic disk and an electromagnetic coil element for writing data signals to the magnetic recording medium.

The magnetic recording medium has a magnetically discontinuous layer where magnetic microparticles are gathered together. Usually, each of the magnetic microparticles has a single magnetic-domain structure, and one recording bit consists of a plurality of the magnetic microparticles. Therefore, for improving the recording density, irregularity in the boundary of the recording bit is required to be reduced by decreasing the size (volume) of the magnetic microparticle. However, a problem is likely to occur that the size decrease causes thermal stability of the magnetization of the recording bit to be degraded.

A guide of the thermal stability of the magnetization is given as $K_U V/k_B T$, where $K_U$ is a magnetic anisotropy energy in the microparticle, V is a volume of a single microparticle, $k_B$ is Boltzmann constant and T is absolute temperature. Decreasing the size of the microparticle is equivalent to decreasing the volume V, thus, the thermal stability is degraded due to degrease in the $K_U V/K_B T$ value. As a measure of the thermal stability problem, it may be possible that the $K_U$ is increased concurrently. However, the increase in the $K_U$ causes the increase in coercive force of the magnetic recording medium. On the other hand, a write field intensity of the magnetic head for writing data signals against the coercive force is limited by the amount of the saturation magnetic flux density of the soft-magnetic pole material of the head. Therefore, the head cannot write data signals to the medium when the coercive force exceeds the write field limit.

As the first method for solving the thermal stability problem, a perpendicular magnetic recording technique may be adopted instead of the conventional longitudinal magnetic recording technique. The thickness of the recording layer in the perpendicular magnetic recording medium can be increased more sufficiently than conventional. As a result, the thermal stability can be improved due to the larger volume V with the larger thickness.

As the second method, a patterned media may be considered as a candidate. While one recording bit consists of N pieces of the magnetic microparticles in the conventional magnetic recording as described above, one recording bit is a single pattern region with volume NV in the patterned media. As a result, the value of the guide of the thermal stability becomes $K_U NV/K_B T$, which means high improvement of the thermal stability.

As the third method for solving the thermal stability problem, a heat-assisted magnetic recording technique is proposed, in which the magnetic head writes data signals to the magnetic medium formed of a material with the large $K_U$ value by reducing the coercive force of the medium with heat supplied to the medium just before the write field is applied. The heat-assisted magnetic recording technique has some similarity to a magnetooptic recording technique, however, obtains a spatial resolution corresponding to a applied magnetic field region, while the magnetooptic recording technique obtain a spatial resolution corresponding to an emitted light spot.

As a proposed heat-assisted magnetic recording, Japanese patent Publication No. 2001-255254A describes a light recording technique utilizing a near-field light probe that has a metal scatterer with strobilus shape formed on a substrate and a dielectric material film formed around the metal scatterer. And Japanese patent Publication No. 10-162444A describes a technique in which a head provided with a solid immersion lens writes ultrafine domains on a magnetooptical disk using a micro light spot. Further, Japanese patent Publication No. 2000-173093A describes a structure in which a metal film with a pinhole is formed on an obliquely cut surface of an optic fiber. Further, U.S. Pat. No. 7,042,810 describes a heat-assisted technique in which an internal laser element emits a light to an optical fine aperture opposed to a medium. Further, Japanese patent Publication No. 2004-158067A describes a scatterer as a near-field light probe, which is formed in contact with the main magnetic pole of a head for a perpendicular magnetic recording in such a way that the irradiated surface of the scatterer is perpendicular to the surface of the medium. Furthermore, IEEE Transactions on Magnetics, Vol. 41, No. 10, pp. 2817-2821, 2005 describes a technique in which a recording pattern with the track width of approximately 70 nm is formed by using a near-field light and a magnetic field generated from a U-shaped near-field light probe formed on a quartz crystal slider.

In the above-described techniques, the method of heating the medium by using a near-field light generated from a near-field light probe or a scatterer which is irradiated with laser light is considered as a promising technique because a near-field light having a required intensity can be obtained with comparative ease.

However, there are some serious problems in these techniques. For example, in the technique described in Japanese patent Publication No. 2004-158067A, the light source is provided in a position much close to the head end surface, that is, much close to the recording medium so as to irradiate the scatterer with a light adequately. This configuration has a possibility that the light source may make contacts with the surface of the recording medium, thus is not preferable from the viewpoint of the apparatus reliability. On another front, this publication proposes a configuration in which the light source is distanced from the medium surface by using a mirror that changes the light direction by 90° (degrees). However, in the configuration, there occurs a problem that a light intensity loss may become larger due to the reflection at the mirror and the substantial elongation of the light path. Furthermore, this configuration of the structured element such as the mirror much close to the head end surface also has the problem associated with the apparatus reliability.

Further, the technique described in IEEE Transactions on Magnetics, Vol. 41, No. 10, pp. 2817-2821, 2005 enables the light to be provided under the condition that the light source is distanced from the medium surface without using any mirror. However, this technique is premised on the configuration in which the probe-formed surface of the head body is parallel with the opposed-to-medium surface of the head body. This configuration is quite different from that of the commonly used thin-film magnetic head in which the probe-formed surface (the element-formed surface) is perpendicular to the opposed-to-medium surface. Therefore, for example, it is highly difficult for this technique to be applied to the thin-film magnetic head for a perpendicular magnetic recording.

In addition, in the above-described techniques, there has occurred a problem that, in some cases, the recording layer of the medium may not be sufficiently heated by the near-field light. Actually, the near-field light exists only much close to the near-field light probe, the optical fine aperture or the scatterer. Then, the substantial existence region has a size of approximately the layer thickness, the tip width or the aperture diameter of the probe, the aperture or the scatterer. That is to say, the electric field intensity of the near-field light is rapidly attenuated from this existence region toward the medium. Therefore, even in the present situation that a flying height of the head is a greatly small value of 10 nm (nanometers) or less, the near-field light may not reach the recording layer of the medium sufficiently. As a result, a write error may occur because the coercive force of the recording layer is not reduced sufficiently during write operation.

BRIEF SUMMARY OF THE INVENTION

Therefore, it is an object of the present invention to provide a thin-film magnetic head that has a configuration in which the element-formed surface and the opposed-to-medium surface are perpendicular to each other, a light source is sufficiently distanced from the medium surface so as to realize high reliability, and a light from the light source can reach a near-field-light-generating means directly and effectively, an HGA provided with this thin-film magnetic head and a magnetic disk drive apparatus provided with this HGA.

And it is another object of the present invention to provide a thin-film magnetic head in which a near-field light generated from a near-field-light-generating means can reach the recording layer of the recording medium sufficiently to reduce the coercive force of the recording layer adequately during write operation, an HGA provided with this thin-film magnetic head and a magnetic disk drive apparatus provided with this HGA.

Here, some terms will be defined before explaining the present invention. In a layered structure of elements formed on an element-formed surface of the slider substrate, a component that is closer to the element-formed surface than a standard layer is defined to be "below" or "lower" in relation to the standard layer, and a component that is in the stacking direction side of the standard layer is defined to be "above" or "upper" in relation to the standard layer.

According to the present invention, a thin-film magnetic head is provided, which comprises: a substrate having an opposed-to-medium surface and an element-formed surface perpendicular to the opposed-to-medium surface; an electromagnetic coil element for writing data signals, formed on/above the element-formed surface, and having a main magnetic pole layer, an auxiliary magnetic pole layer and a write coil layer; and at least one near-field-light-generating (NFL-generating) layer for heating a part of a magnetic medium during write operation by generating a near-field light, the at least one NFL-generating layer having a shape tapered toward a head end surface on the opposed-to-medium surface side, and comprising a NFL-generating portion having a light-received surface and a tip reaching the head end surface on the opposed-to-medium surface side, and the light-received surface being sloped in respect to the element-formed surface in the form that a portion in the head end surface side of the light-received surface is lifted up and being provided in a position where an incident light propagating from a head end surface opposite to the opposed-to-medium surface can reach at least a part of the light-received surface.

In this thin-film magnetic head having a configuration in which the element-formed surface and the opposed-to-medium surface are perpendicular to each other, an incident laser light propagating across the head end surface opposite to the opposed-to-medium surface can be applied to the light-receive surface directly and effectively. As a result, plasmons are effectively excited, and a near-field light with extraordinary high intensity of its electric field is generated much close to the tip of the NFL-generating layer. The near-field light sufficiently heats an opposed portion of the magnetic disk quite locally, and decreases the coercive force of the heated portion to the degree that a write operation can be performed by using the write field generated from the head. Accordingly, it becomes possible that the electromagnetic coil element writes data signals to the magnetic disk with high coercive force for higher recording density. Furthermore, the apparatus reliability becomes improved because a light source can be provided outside the thin-film magnetic head.

In the thin-film magnetic head according to the present invention, at least one of the at least one NFL-generating layer preferably comprises a first reflective portion that has a first reflecting surface parallel to the element-formed surface, and is preferably positioned on the opposite side to the opposed-to-medium surface in relation to the NFL-generating portion. Further, it is also preferable that at least one of the at least one NFL-generating layer further comprises a second reflective portion that has at least one second reflecting surface with a slope angle in respect to the element-formed surface smaller than that of the light-received surface, and is positioned between the NFL-generating portion and the first reflective portion.

The reflecting surface plays a role of supplementing the amount of light received on the light-received surface by reflecting a part of the incident laser light that propagates across the head end surface, and by directing the reflected light toward the light-received surface, which improves the efficiency of the near-field light generation.

Further, in the thin-film magnetic head according to the present invention, in the case that the main magnetic pole layer is provided in a position on the opposite side to the light-received surface in relation to one of the at least one NFL-generating layer, the NFL-generating portion and an end portion in the opposed-to-medium surface side of the main magnetic pole layer are preferably overlapped through a dielectric layer or directly. Furthermore, in the case, it is also preferable that the NFL-generating portion and the end portion of the main magnetic pole layer are sloped in respect to the element-formed surface in the form that portions in the opposed-to-medium surface side of the NFL-generating portion and the end portion are lifted up or pulled down.

Further, in the case that the main magnetic, pole layer is provided in a position on the light-received surface side in relation to one of the at least one NFL-generating layer, the main magnetic pole layer and the NFL-generating layer are preferably in contact with or close to each other only at an end in the opposed-to-medium surface side of the main magnetic pole layer and at a tip of the NFL-generating layer reaching the head end surface on the opposed-to-medium surface side.

Further, in the case that the least one NFL-generating layer is two NFL-generating layers, two light-received surfaces of the two NFL-generating layers are preferably sloped in respect to the element-formed surface in the form that portions in the opposed-to-medium surface side of the two light-received surfaces are lifted up and pulled down respectively, and two tips of the two NFL-generating layers reaching the head end surface on the opposed-to-medium surface side are preferably in contact with or close to each other.

Further, in the thin-film magnetic head according to the present invention, it is also preferable that an overcoat layer is further provided on the element-formed surface so as to cover the electromagnetic coil element and the at least one NFL-generating layer, and a region of the overcoat layer including all the light paths of an incident light propagating from the head end surface opposite to the opposed-to-medium surface to the light-received surface is formed of silicon dioxide ($SiO_2$) or an oxide that consists primarily of silicon dioxide.

Further, in the thin-film magnetic head according to the present invention, it is also preferable that an overcoat layer is further provided on the element-formed surface so as to cover the electromagnetic coil element and the at least one NFL-generating layer, and a thermal protrusion layer made of a material having a larger coefficient of thermal expansion than that of the overcoat layer is provided close to the NFL-generating portion. Here, the material of which the thermal protrusion layer is made is preferably a non-magnetic metal.

In the case that the thermal protrusion layer is provided, a part of the near-field light generated from the NFL-generating layer heats the adjacent thermal protrusion layer. The thermal protrusion layer, which has a larger coefficient of thermal expansion as described above, expands largely by the heating, and especially its end surface on the head end surface side is significantly protruded toward the magnetic disk. Then, the tip of the NFL-generating layer and the end of the main magnetic pole layer are also protruded largely toward the magnetic disk by being dragged with the expanding thermal protrusion layer or by expanding themselves thermally. The large protrusion of the tip of the NFL-generating layer causes the near-field light to reach the recording layer of the magnetic disk more sufficiently, which enables the coercive force of the recording layer to be reduced to a required degree during write operation. Moreover, the large protrusion of the end of the main magnetic pole layer causes a magnetic spacing, which is an effective magnetic distance between the end and the disk surface, to become smaller. As a result, the write field can sufficiently reach the recording layer, thus the writing efficiency can be improved.

Further, in the case that the thermal protrusion layer is provided, and the main magnetic pole layer is provided in a position on the opposite side to the light-received surface in relation to one of the at least one NFL-generating layer, the thermal protrusion layer is preferably positioned between the NFL-generating portion and an end portion in the opposed-to-medium surface side of the main magnetic pole layer, and is preferably in contact with or close to the end portion.

Further, in the case, it is also preferable that the main magnetic pole layer is provided in a position on the light-received surface side in relation to one of the at least one NFL-generating layer, and the main magnetic pole layer and the NFL-generating layer are in contact with or close to each other only at an end in the opposed-to-medium surface side of the main magnetic pole layer and at a tip of the NFL-generating layer reaching the head end surface on the opposed-to-medium surface side, and the thermal protrusion layer is positioned on the opposite side to the main magnetic pole layer in relation to the NFL-generating portion.

Further, in the thin-film magnetic head according to the present invention, it is preferable that an overcoat layer is further provided on the element-formed surface so as to cover the electromagnetic coil element and the at least one NFL-generating layer, and a cavity is formed in a region in the opposite side to the opposed-to-medium surface of the overcoat layer and reaching the head end surface opposite to the opposed-to-medium surface, to which an end portion of an optic fiber for launching a light toward at least one NFL-generating-layer can be inserted, and the cavity has a light-received wall surface for receiving and allowing passage of the light from the optic fiber, the light-received wall surface recessed from the head end surface opposite to the opposed-to-medium surface toward at least one NFL-generating layer.

In the case that the cavity is provided, the light-received wall surface of the cavity is recessed from the head end surface opposite to the opposed-to-medium surface toward the side of the NFL-generating layer. That is to say, the light-received wall surface is parallel or almost parallel to the head end surface, and provided closer to the NFL-generating layer than the head end surface. Here, when the end portion of an optic fiber for launching a laser light toward the NFL-generating layer is inserted to the cavity, the laser light from the optic fiber propagates across the light-received wall surface toward the NFL-generating layer. In the case, because the end surface of the optic fiber is positioned closer to the NFL-generating layer, and therefore, the laser light can reach the NFL-generating layer with lower propagation loss, compared to the case in which a light propagates across the head end surface without a cavity. As a result, improved is the efficiency of the near-field light generation.

Further, in the case that the cavity is provided and a MR effect element for reading data signals is further provided between the element-formed surface and the electromagnetic coil element, a bottom surface parallel to the element-formed surface of the cavity is preferably positioned above a region on the rear side of the MR effect element when viewing from the opposed-to-medium surface side.

Further, in the case, it is also preferable that a reflective layer is further provided on the light-received surface side of the at least one NFL-generating-layer, having a third reflecting surface for reflecting a part of incident light that propagates across the light-received wall surface and directing the light toward the light-received surface. In the case, the third reflecting surface is preferably sloped in respect to the element-formed surface so as to reflect a part of incident light that propagates obliquely across the light-received wall surface and direct the light toward the light-received surface. Furthermore, an antireflective film having a monolayer structure or a multilayered structure is preferably formed on the light-received wall surface.

According to the present invention, a HGA is further provided, which comprises: the above-described thin-film magnetic head; a support mechanism for supporting the thin-film magnetic head; trace conductors for the electromagnetic coil element; trace conductors for a MR effect element when the thin-film magnetic head comprises the MR effect element;

and an optic fiber for launching a light that propagates across the head end surface opposite to the opposed-to-medium surface.

According to the present invention, a magnetic disk drive apparatus is further provided, which comprises: the above-described HGA; at least one magnetic disk; a light source for providing the light to the optic fiber; and a recording/reproducing and light-emission control means for controlling read and write operations of the thin-film magnetic head to the at least one magnetic disk and for controlling an emitting operation of the light source.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL VIEWS OF THE DRAWINGS

FIG. 3b shows a plain view schematically illustrating a magnetic head element shown in FIG. 3a;

FIGS. 7a to 7c2 show cross-sectional views and perspective views schematically illustrating various alternatives of the NFL-generating layer in the first embodiment of the thin-film magnetic head according to the present invention;

FIG. 10b shows a plain view schematically illustrating a magnetic head element shown in FIG. 10a;

DETAILED DESCRIPTION OF THE INVENTION

Figure 1:
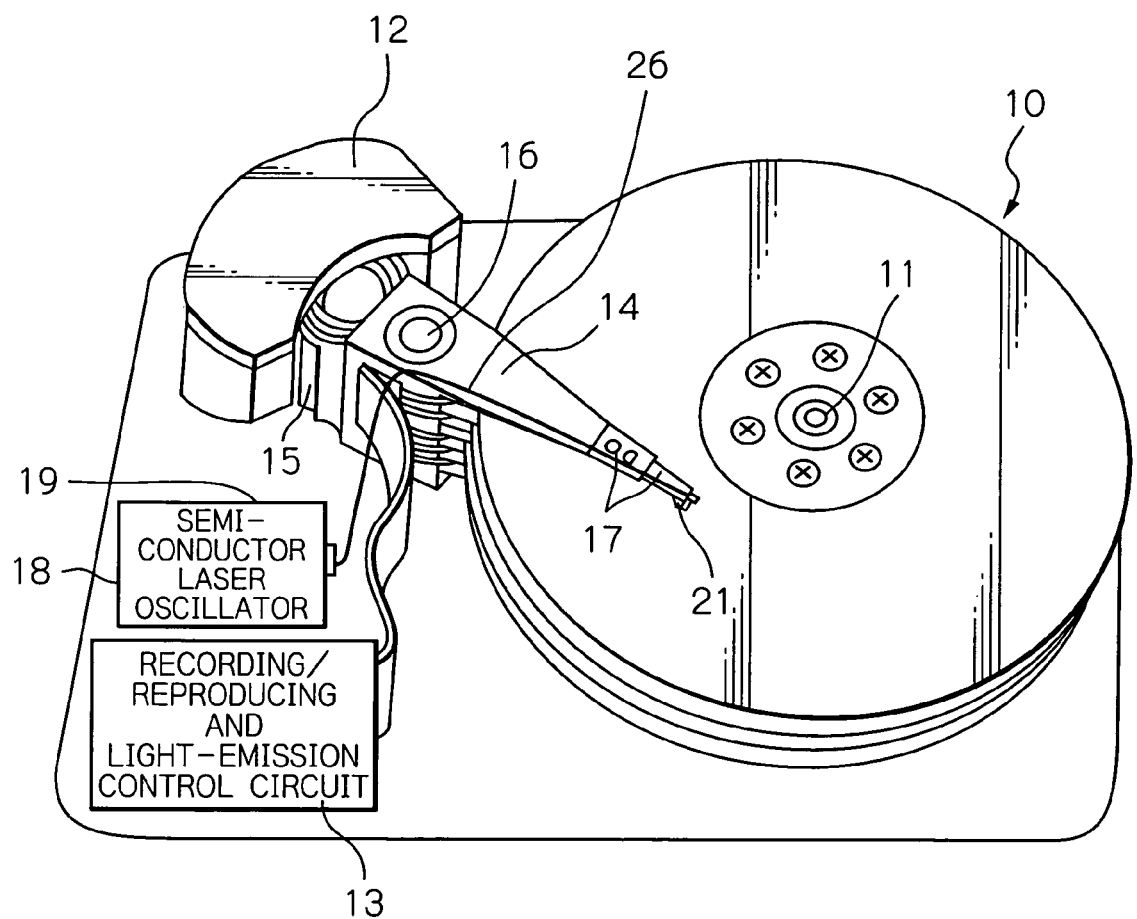
FIG. 1 shows a perspective view schematically illustrating a major portion of an embodiment of the magnetic disk drive apparatus according to the present invention.

FIG. 1 shows a perspective view schematically illustrating a major portion of an embodiment of the magnetic disk drive apparatus according to the present invention.

In FIG. 1, reference numeral 10 indicates a plurality of magnetic disks (magnetic media) for a perpendicular magnetic recording, rotating around a rotational axis of a spindle motor 11, 12 indicates an assembly carriage device for positioning a thin-film magnetic head (slider) 21 for the perpendicular magnetic recording on a track, and 13 indicates a recording/reproducing and light-emission control circuit for controlling read/write operations of the thin-film magnetic head and controlling a semiconductor laser oscillator 18 that is a light source for generating a laser light used for heat-assisting operation, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A slider 21 is mounted on each HGA 17 in such a way as to be opposed to the surface of the magnetic disk 10. The each number of the magnetic disks 10, the drive arms 14, the HGAs 17 and the thin-film magnetic heads (sliders) 21 can also be only one.

The semiconductor laser oscillator 18 provides a laser light to an optic fiber 26, and for this purpose, the cross-section surface of the optic fiber 26 is connected to an active layer position of the semiconductor laser oscillator 18 through a first fiber holder 19. The oscillation wavelength of the laser is, for example, 800 nm (nanometers).

Figure 2A:
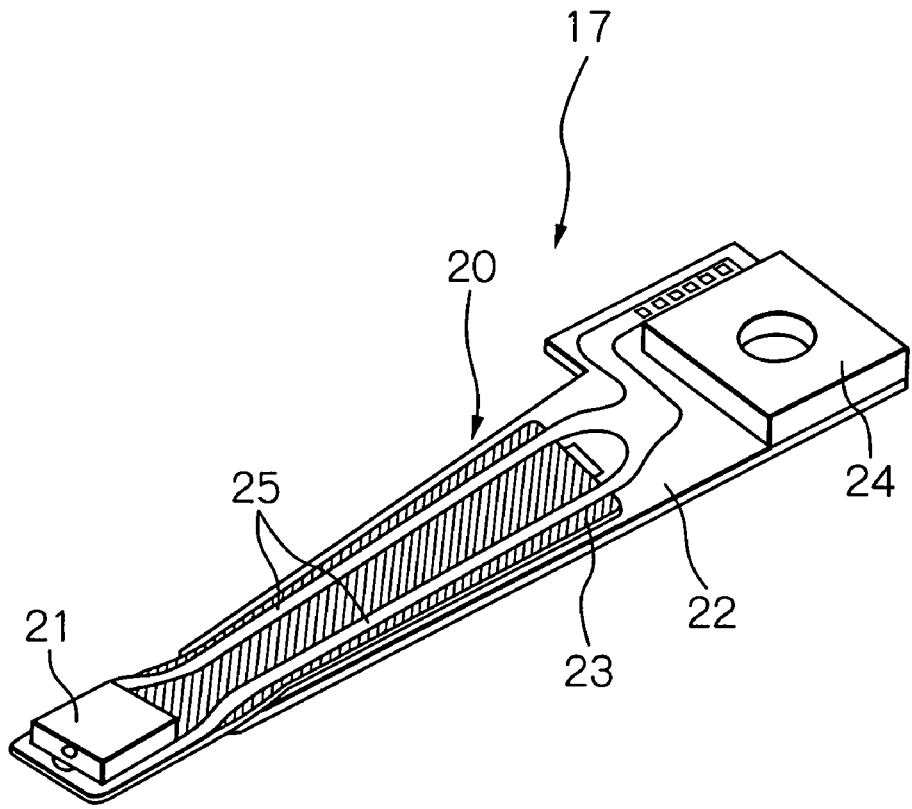
FIGS. 2a and 2b show perspective views illustrating an embodiment of the HGA according to the present invention.
Figure 2B:
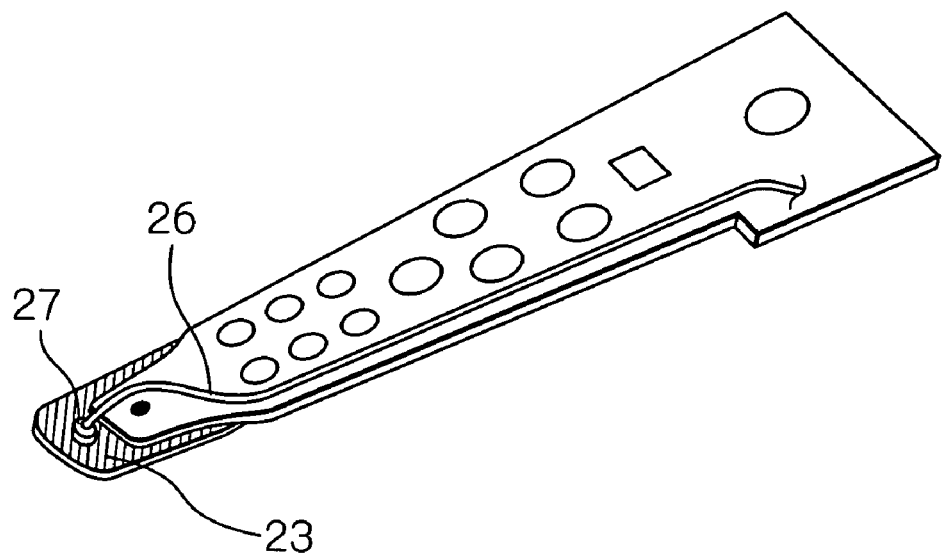

FIGS. 2a and 2b show perspective views illustrating an embodiment of the HGA according to the present invention. Here, FIG. 2a is illustrated by viewing from the side opposed to the magnetic disk of the HGA 17, and FIG. 2b is illustrated by viewing from the opposite side.

As shown in FIG. 2a, the HGA 17 is constructed by fixing a thin-film magnetic head (slider) 21 having a magnetic head element on an end portion of a suspension 20 and by electrically connecting one end of a wiring member 25 to signal electrodes of the thin-film magnetic head 21.

The suspension 20 is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23.

As shown in FIG. 2b, the HGA 17 further has the optic fiber 26 for providing a laser light into one head end surface of the thin-film magnetic head 21, as described later. The laser-emitted cross-section surface of the optic fiber 26 is fixed by a second fiber holder 27 on the flexure 23 in such a way that the laser light can be applied to the head end surface of the head 21. The diameter of the laser-emitted cross-section surface of the optic fiber 26 is, for example, approximately 5 μm (micrometers) to approximately 500 μm, and the beam diameter of the emitted laser light is also, for example, approximately 5 μm (micrometers) to approximately 500 μm.

It is obvious that the structure of the suspension in the HGA according to the present invention is not limited to the above-described one. Though not shown in the figures, it is also possible to attach a head drive IC chip or a semiconductor laser oscillator for providing a laser light to the optic fiber 26 at some midpoint of the suspension 20.

Figure 3A:
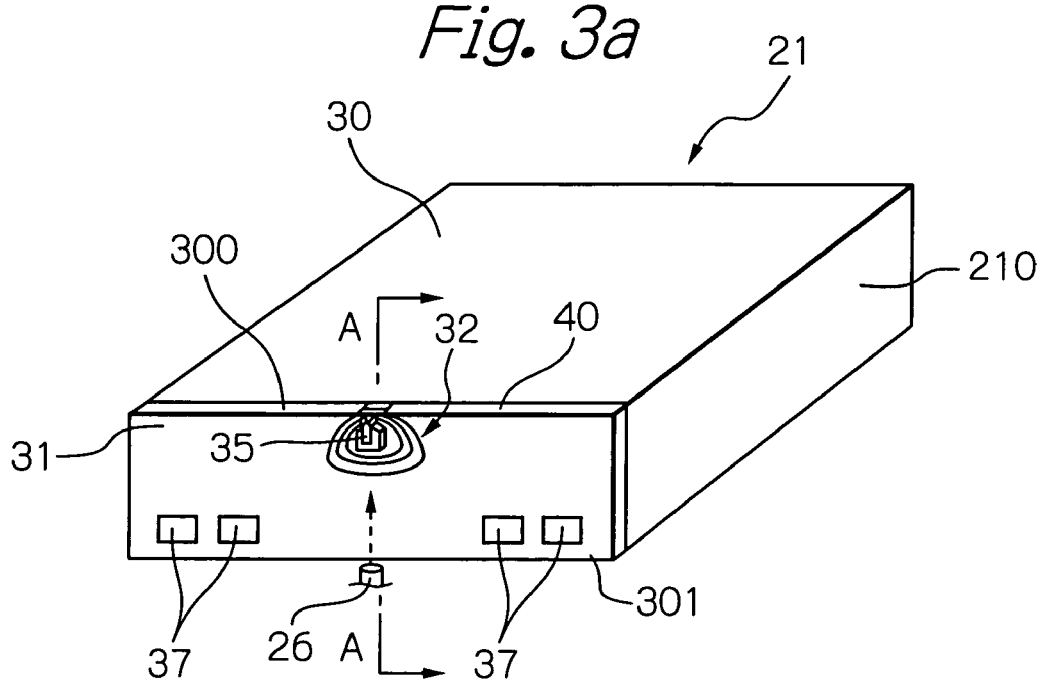
FIG. 3a shows a perspective view of the first and second embodiments of the thin-film magnetic head provided on the end portion of the HGA.
Figure 3B:
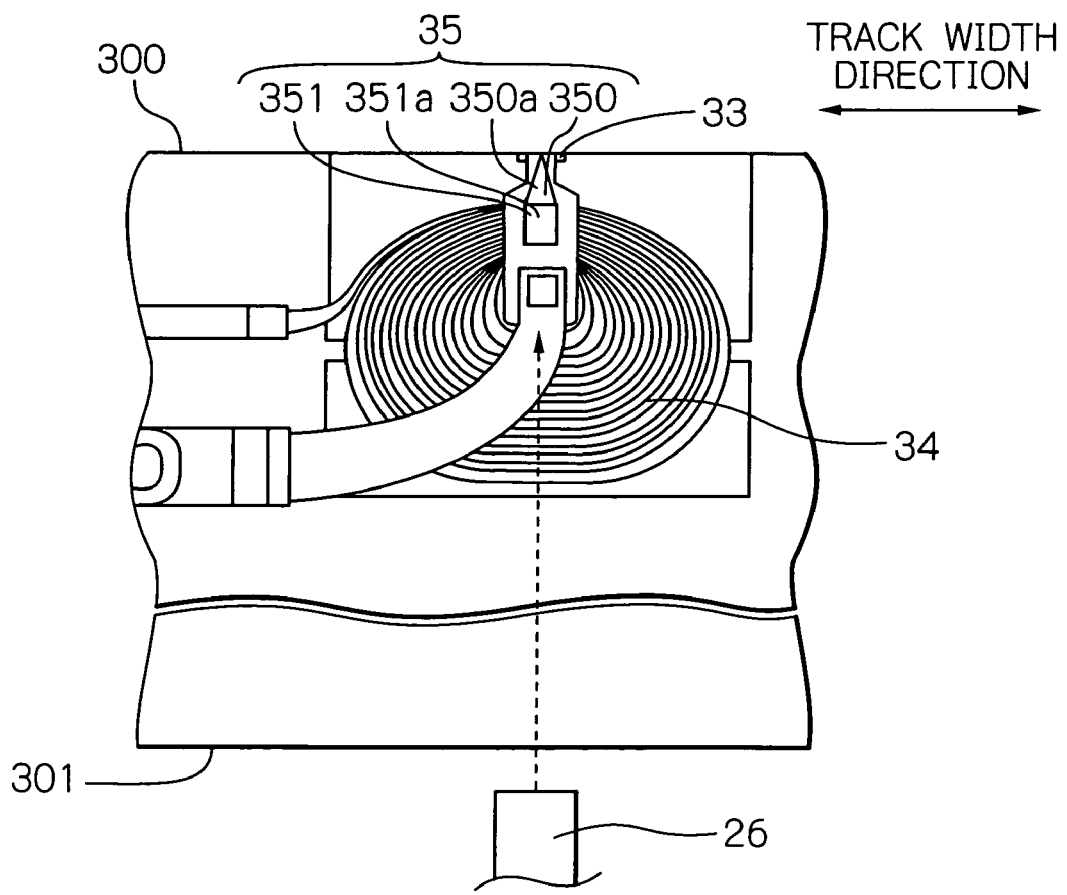

FIG. 3a shows a perspective view of the first and second embodiments of the thin-film magnetic head provided on the end portion of the HGA, and FIG. 3b shows a plain view schematically illustrating a magnetic head element shown in FIG. 3a.

As shown in FIG. 3a, the thin-film magnetic head (slider) 21 is provided with a slider substrate 210 having an air bearing surface (ABS) 30 as an opposed-to-medium surface for obtaining an appropriate flying height and an element-formed surface 31 perpendicular to the ABS 30, a magnetic head element 32 formed above/on the element-formed surface 31, a near-field-light-generating (NFL-generating) layer 35 for generating a near-field light used for the heat-assisted magnetic recording, four signal electrodes 37 exposed on the surface of an overcoat layer 40 formed on the element-formed surface 31. The magnetic head element 32 has an MR effect element 33 (shown in FIG. 3b) for reading data signals and an electromagnetic coil element 34 (shown in FIG. 3b) for writing data signals. Respective two of the four signal electrodes 37 are connected with the MR effect element 33 and the electromagnetic coil element 34. The number and positions of the electrodes are not limited to the embodiment shown in FIG. 3a. In the embodiment, there are four electrodes, however it is also possible to provide three electrodes and a ground connected to the slider substrate.

Here, the light from the optic fiber 26 is applied toward the NFL-generating layer 35 across the head end surface 301 opposite to the head end surface 300 that is on the ABS 30 side and is opposed to the magnetic disk.

As shown in FIG. 3b, one ends of the MR effect element 33 and the electromagnetic coil element 34 reach the head end surface 300. During write and read operations, the thin-film magnetic head 21 hydrodynamically flies with a predetermined flying height above a rotating magnetic disk, and the one ends of the elements become opposed to the surface of the magnetic disk, then the head 21 performs a read operation by sensing signal fields from the magnetic disk and a write operation by applying signal fields to the magnetic disk.

The NFL-generating layer 35 is provided, in this embodiment, on the electromagnetic coil element 34, and has a shape tapered toward the head end surface 300 opposed to the magnetic disk. The NFL-generating layer 35 includes an NFL-generating portion 350 for generating the near-field light by receiving a laser light from the optic fiber 26, and a reflective portion 351 having a reflecting surface 351a for directing the laser light from the optic fiber 26 to the NFL-generating portion 350.

The NFL-generating portion 350 includes a tip reaching the head end surface 300, and has, for example, an isosceles triangle shape, and is provided with a light-received surface 350a. When a laser light from the optic fiber 26 is applied to the light-received surface 350a, a near-field light with extraordinary high intensity of its electric field is generated from the tip reaching the head end surface 300, as described later. The generated near-field light enables a heat-assisting operation to be performed.

Figure 4A:
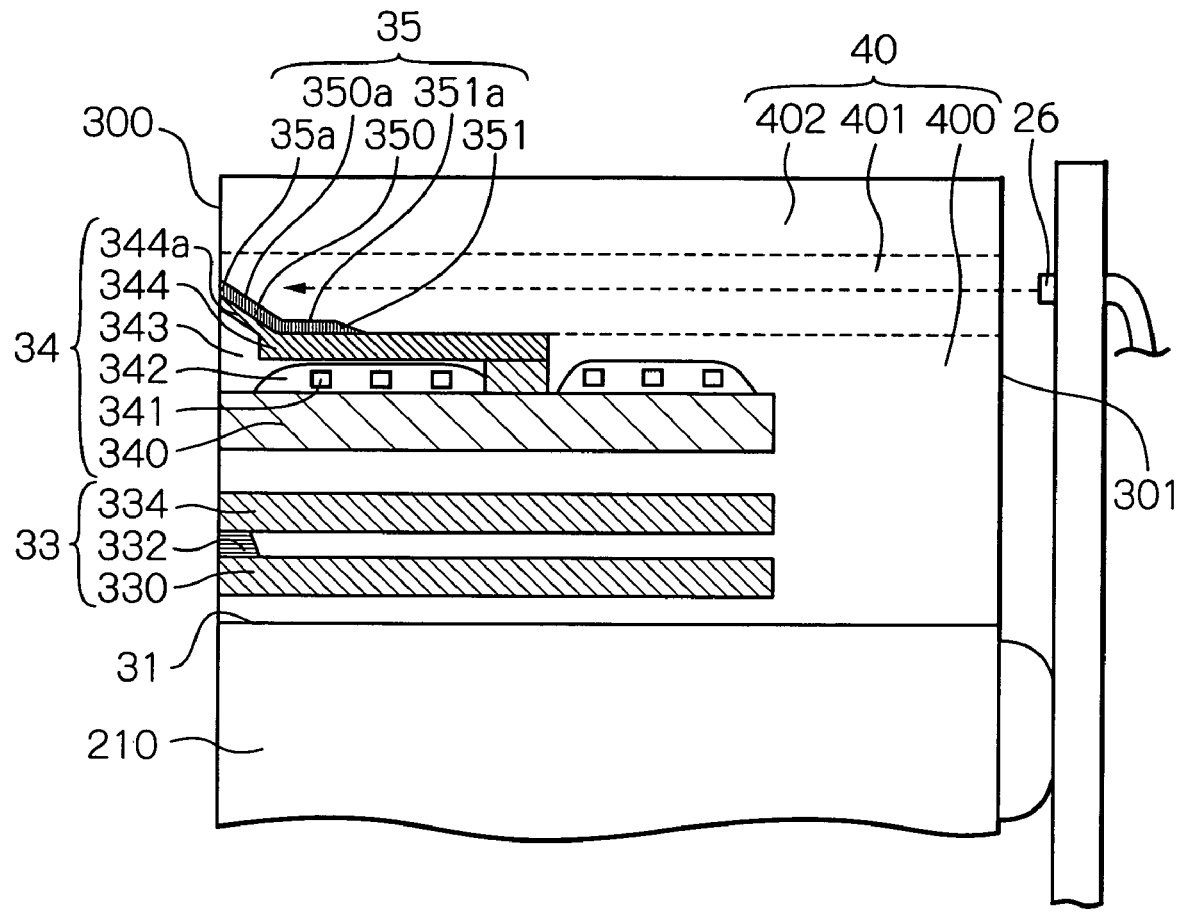
FIG. 4a shows a cross-sectional view taken along the line A-A in FIG. 3a schematically illustrating a major portion of the first embodiment of the thin-film magnetic head according to the present invention.
Figure 4B:
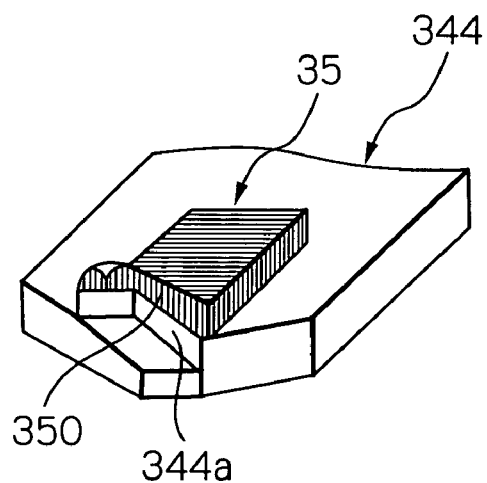
FIG. 4b shows a perspective view schematically illustrating the NFL-generating layer and the main magnetic pole layer that are overlapped with each other.

FIG. 4a shows a cross-sectional view taken along the line A-A in FIG. 3a schematically illustrating a major portion of the first embodiment of the thin-film magnetic head according to the present invention, and FIG. 4b shows a perspective view schematically illustrating the NFL-generating layer and the main magnetic pole layer that are overlapped with each other. The number of turns of the coil shown in FIG. 4a may be smaller than the actual one, for simplicity of drawings.

As shown in FIG. 4a, the MR effect element 33 has an MR multilayer 332, a lower shield layer 330 and an upper shield layer 334 provided in positions sandwiching the MR multilayer 332. The MR multilayer 332 includes a tunnel magnetoresistive (TMR) multilayered film in which a tunnel barrier layer is pinched by a free layer and a pinned layer, a current-perpendicular-to-plane giant magnetoresistive (CPP-GMR) multilayered film, or a current-in-plane giant magnetoresistive (CIP-GMR) multilayered film, and senses signal fields from the magnetic disk with excellently high sensitivity.

When the MR multilayer 332 includes the CIP-GMR multilayered film, upper and lower shield gap layers are provided in respective positions between the MR multilayer 332 and each of the upper and lower shield layers 334 and 330, and further, an MR lead conductive layer is formed for applying sense currents and bringing out reproduction outputs. Whereas, when the MR multilayer 332 includes the CPP-GMR or TMR multilayered film, the upper and lower shield layers 334 and 340 act also as lower and upper electrodes, respectively. In the case, the upper and lower shield gap layers and the MR lead conductive layer are unnecessary and omitted.

The lower shield layer 330 is stacked above/on the element-formed surface 31 of the slider substrate 210 made of AlTiC ($Al_2O_3$—TiC), etc., formed of, for example, NiFe, CoFeNi, CoFe, FeN, FeZrN or the multilayer of at least two of these materials, with thickness of approximately 0.3 μm to 3 μm. The upper shield layer 334 are formed of, for example, NiFe, CoFeNi, CoFe, FeN, FeZrN or the multilayer of at least two of these materials, with thickness of approximately 0.3 μm to 4 μm. A read gap length, which is a distance between the upper and lower shield layers 334 and 330, is, for example, approximately 0.02 μm to 1 μm.

The electromagnetic coil element 34 is for perpendicular magnetic recording, and includes an auxiliary magnetic pole layer 340, a write coil layer 341, a coil-insulating layer 342, a gap layer 343 and a main magnetic pole layer 344. The main magnetic pole layer 344 is a magnetic path to guide and converge the magnetic flux excited by currents flowing through the write coil layer 341. The length (thickness) in the stacking direction of the end portion 344a in the head end surface 300 side of the main magnetic pole layer 344 becomes smaller than that of the other portions. As a result, the main magnetic pole layer 344 can generate a fine write field corresponding to higher density recording.

The auxiliary magnetic pole layer 340 is formed of, for example, an alloy of two or three elements selected from a group consisting of Ni, Fe and Co, or an alloy of the two or three elements to which at least one appropriate element is added, with thickness of approximately 0.5 µm to 5 µm. The write coil layer 341 is formed of, for example, Cu with thickness of approximately 0.5 µm to 3 µm. The coil insulating layer 342 is formed of, for example, a heat-cured resist so as to cover the write coil layer 341, with thickness of approximately 0.1 µm to 5 µm. The gap layer 343 is formed of, for example, $Al_2O_3$, $SiO_2$, AlN or DLC (diamond-like carbon), with thickness of approximately 0.01 µm to 0.5 µm. The main magnetic pole layer 344 is formed of, for example, an alloy of two or three elements selected from a group consisting of Ni, Fe and Co, or an alloy of the two or three elements to which at least one appropriate element is added, with thickness of approximately 0.01 µm to 0.5 µm in the end portion on the ABS side and with thickness of approximately 0.5 µm to 3 µm in the other portions.

As an alternative, though not shown in the figure, a shielding-between-elements layer and a backing coil element may be formed between the MR effect element 33 and the electromagnetic coil element 34. The backing coil element suppresses the wide area adjacent-track erase (WATE) behavior which is an unwanted write or erasing operation to the magnetic disk, by generating a magnetic flux for negating the magnetic loop that arises from the electromagnetic coil element 34 through the upper and lower shield layers of the MR effect element 33. The write coil layer 341 is a monolayer in the embodiment shown in FIG. 4a, however may have a two or more layered structure or a helical coil shape.

Also as shown in FIG. 4a, the NFL-generating layer 35 includes the reflective portion 351 and the NFL-generating portion 350 that is formed of Au, Pd, Pt, Rh, Ir or an alloy of at least two selected from these elements, or the alloy to which Al, Cu, etc. is added. The light-received surface 350a of the NFL-generating portion 350 is sloped in respect to the element-formed surface 31 in the form that the portion in the head end surface 300 side of the surface 350a is lifted up, and is provided in a position where a laser light from the optic fiber 26 can reach at least a part of the light-received surface 350a across the head end surface 301. In an actual heat-assisting operation, first, when a coherent laser light from the optic fiber 26 reaches the light-received surface 350a across the head end surface 301, the electric field of the laser light forces inner free electrons in the material such as Au of the NFL-generating portion 350 to be oscillated uniformly. And then, plasmons are excited, and propagates toward a tip 35a on the head end surface 300 side of the NFL-generating portion 350, and causes a near-field light with extraordinary high intensity of its electric field to be generated much close to the tip 35a. The near-field light heats an opposed portion of the magnetic disk quite locally, and decreases the coercive force of the heated portion to the degree that a write operation can be performed by using the write field generated from the head. Accordingly, it becomes possible that the electromagnetic coil element 34 writes data signals to the magnetic disk with high coercive force for higher recording density.

Actually, the above-described heat-assisted magnetic recording technique has a possibility to achieve a much higher recording density of an order of 1 Tbits/$in^2$ by making the thin-film magnetic head for perpendicular magnetic recording write data signals to the magnetic disk with high coercive force to micrify recording bits.

The reflective portion 351 is provided in a position opposite to the head end surface 300 in relation to the NFL-generating portion 350, and has the reflecting surface 351a parallel to the element-formed surface 31. The reflecting surface 351a supplements the amount of light received on the light-received surface 350a by reflecting a part of the incident laser light that propagates from the optic fiber 26 across the head end surface 301, and by directing the reflected light toward the light-received surface 350a, which improves the efficiency of the near-field light generation.

Here, the NFL-generating layer 35 has a thickness of, for example, approximately 50 nm (nanometers) to 500 nm, and the distance between the head end surface 300 and the opposite end to the surface 300 of the NFL-generating layer 35 is, for example, approximately 10 µm (micrometers) to 500 µm. And the width in the track width direction of the reflective portion 351 is, for example, approximately 20 µm (micrometers) to 500 µm. Further, the width of the tip 35a is, for example, approximately 15 nm to 40 nm. The tip 35a of the NFL-generating layer 35 generates a near-field light having a comparable amount of light width with the above-described thickness or the tip width. The electric field of the near-field light is attenuated exponentially in the region beyond the light width, and therefore, can heat the recording layer quite locally. Furthermore, the near-field light extends in the region ranging from the tip toward the magnetic disk by a distance of the above-described thickness or the tip width. As a result, the near-field light can reach the recording layer sufficiently because the flying height, which is a spacing between the head and the disk, is 10 nm or less under the present situation.

The overcoat layer 40 is formed on the element-formed surface 31 so as to cover the MR effect element 33, electromagnetic coil element 34 and the NFL-generating layer 35. The overcoat layer 40 has a layered structure in the stacking direction (a direction perpendicular to the surface 31) of a first overcoat layer 400 ranging from the element-formed surface 31 to the upper surface of the main pole magnetic layer 344 except its end portion 344a, a second overcoat layer 401 ranging from the upper surface to a region on the upper side of the NFL-generating portion 350, and a third overcoat layer 402 occupying a region above the above-described region.

The second overcoat layer 401 includes all the light paths of the incident laser light from the head end surface 301 to the light-received surface 350a, and is formed of $SiO_2$ (silicon dioxide) or an oxide that consists primarily of $SiO_2$, which has a sufficient high transmittance for the laser light generated from the semiconductor laser oscillator 18 (FIG. 1). The second overcoat layer 401 enables the incident laser light to be much less attenuated, and therefore, improves the efficiency of the generation of the near-field light due to the increase in the amount of light received on the light-received surface 350a. The first and third overcoat layers 400 and 402 may be formed of, for example, $Al_2O_3$ (alumina) as usually used for overcoat. The second overcoat layer 401 may be a layer with a predetermined width in the track width direction, under the condition of including the light paths. In the case, by forming alumina layers on both sides in the track width direction of the second overcoat layer, the mechanical strength of the overcoat layer 40 can be sufficiently maintained due to the enhancement of the adhesion strength between the first and third overcoat layers.

The main magnetic pole layer 344 is provided in a position on the opposite side to the light-received surface 350a, that is, on the leading side of the NFL-generating layer 35. Further, the end portion 344a of the main magnetic pole layer 344 and the NFL-generating portion 350 are overlapped directly with each other, as shown in the perspective view of FIG. 4b. This overlapped structure enables a portion to be written of the recording layer (track) to be heated surely. Furthermore, the end portion 344a that has surface contact with the NFL-generating portion 350 plays a role of a heatsink for preventing excess temperature rise of the NFL-generating portion 350.

In addition, in the embodiment, it should be noted that the end portion 344a of the main magnetic pole layer 344 that is a main generating region of the write field is positioned on the leading side of the tip 35a of the NFL-generating portion 350 that is a main generating region of the near-field light, and therefore, during actual writing, a heat-assisting operation and a write operation are performed almost simultaneously, or a write operation is performed after the recording layer portion heated by the heat-assisting operation returns to the head position by making at least one circle.

Further, the end portion 344a of the main magnetic pole layer 344 and the NFL-generating portion 350 are sloped in respect to the element-formed surface 31 in the form that portions in the head end surface 300 side of these portions 344a and 350 are lifted up. The effect of the slope will be explained below.

Figure 5A:
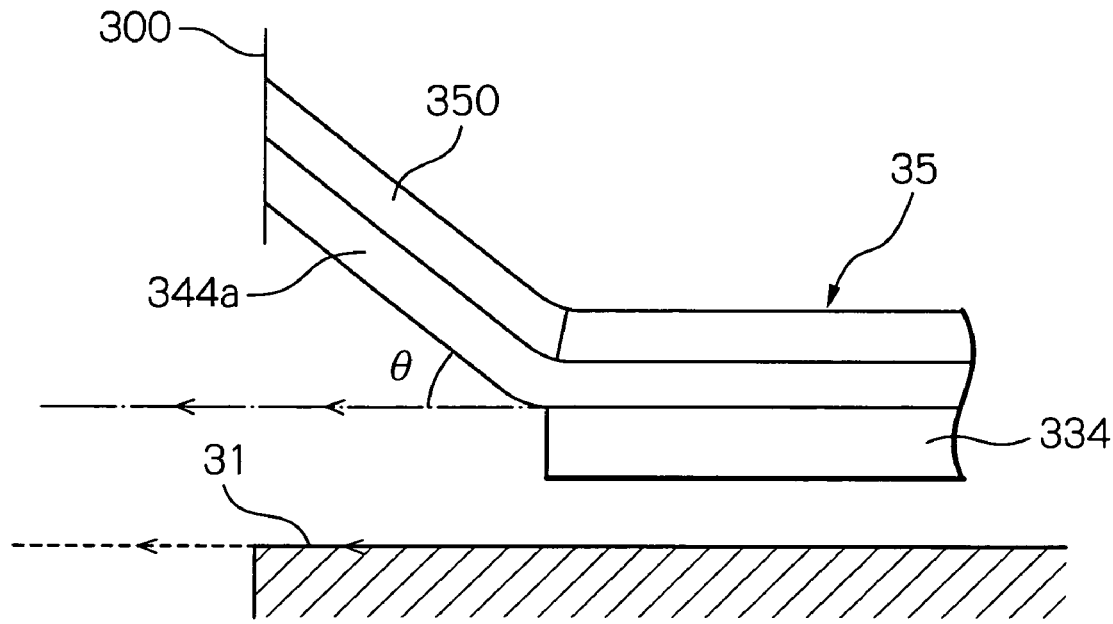
FIG. 5a shows a schematic view for defining a slope angle $\theta$.
Figure 5B:
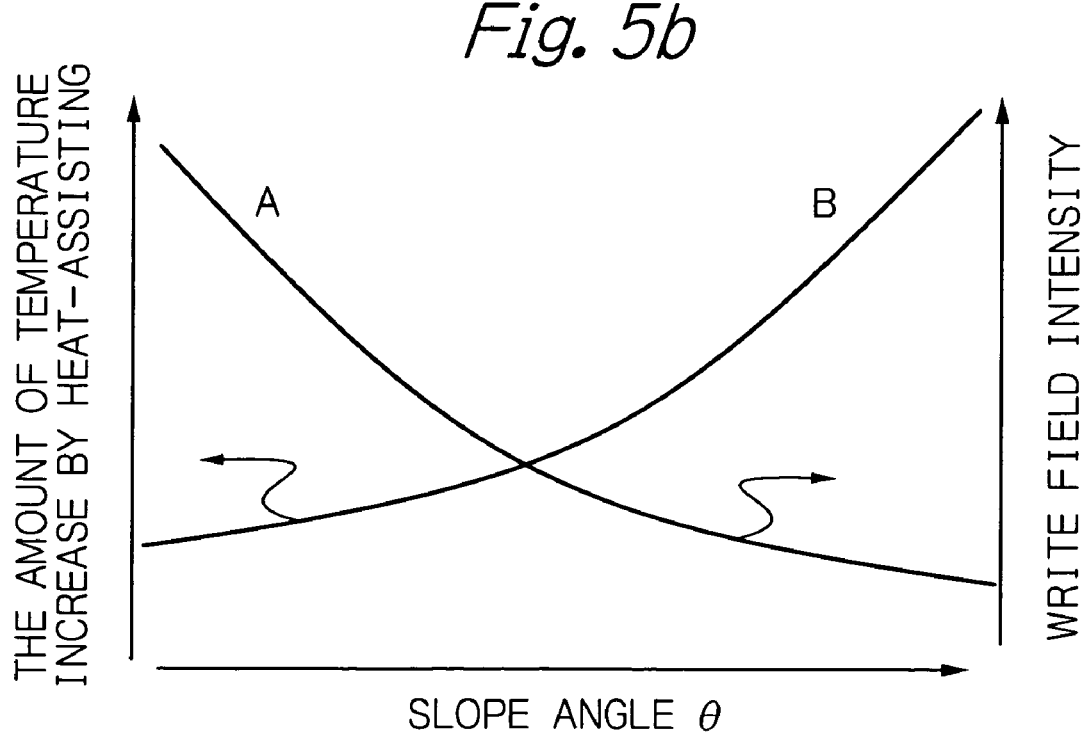
FIG. 5b shows a conceptual graph explaining the effect of the slope angle $\theta$.

FIG. 5a shows a schematic view for defining a slope angle θ (theta), and FIG. 5b shows a conceptual graph explaining the effect of the slope angle θ.

In FIG. 5a, the slope angle θ is defined as an angle that the overlapped portion of the end portion 344a and the NFL-generating portion 350 forms with the element-formed surface 31. Here, as shown by a curve A in FIG. 5b, the intensity of the write field generated from the end portion 344a is decreased as the slope angle θ increases, because the vertical component of the write field decreases as the θ increases. On the other hand, as shown by a curve B in FIG. 5b, the amount of the temperature increase of the recording layer of the magnetic disk by the heat-assisting operation is increased as the slope angle θ increases, because the amount of the received light on the light-received surface increases as the θ increases. Therefore, the θ value can be chosen from a certain range under one condition that the coercive force of the recording layer should be sufficiently reduced by the heat-assisting operation and the opposite condition that the effective intensity of the write field should be maintained. Further, in the θ value design, it is also preferable that the θ value may be set to a rather large value so that the light-received surface could receive a required amount of light surely with an adequate margin even when the light from the optic fiber is fluctuating in a possible range by, for example, the flexure vibration. In the embodiment shown in FIGS. 4a and 4b, the 0 value is, for example, approximately 400 (degrees) to 500.

FIGS. 6a to 6d and 7a to 7c2 show cross-sectional views and perspective views schematically illustrating various alternatives of the NFL-generating layer in the first embodiment of the thin-film magnetic head according to the present invention.

Figure 6A:
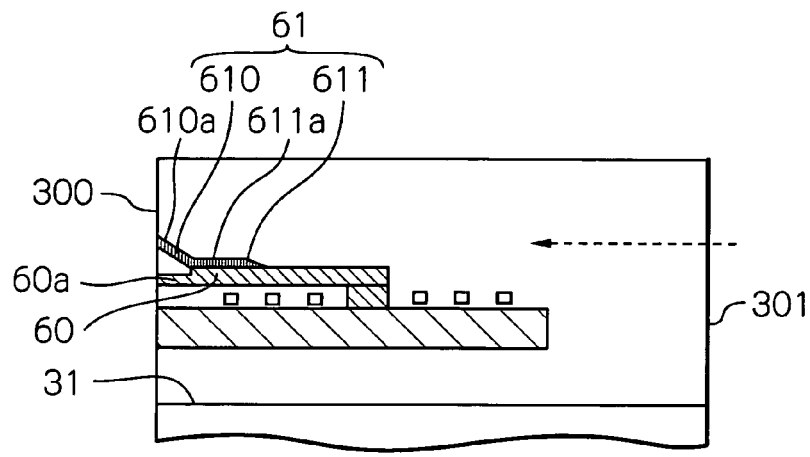
FIGS. 6a to 6d show cross-sectional views and perspective views schematically illustrating various alternatives of the NFL-generating layer in the first embodiment of the thin-film magnetic head according to the present invention.

As shown in FIG. 6a, a light-received surface 610a of an NFL-generating portion 610 is sloped in respect to the element-formed surface 31 in the form that the portion in the head end surface 300 side of the surface 610a is lifted up, and is provided in a position where a laser light from the optic fiber 26 can reach at least a part of the light-received surface 610a across the head end surface 301, as is in the case with the first embodiment shown in FIG. 4a. And a main magnetic pole layer 60 is provided in a position on the opposite side to the light-received surface 610a, that is, on the leading side of the NFL-generating layer 61.

However, in the alternative, an end portion 60a of the main magnetic pole layer 60 is not overlapped with the NFL-generating portion 610. As a result, the intensity of the write field generated from the end portion 60a can be sufficiently maintained due to avoidance of the decrease in the vertical component by being sloped. Here, it should be noted that a position on the head end surface 300 where the write field is generated is displaced by a certain distance from a position where the near-field light is generated toward the leading side, and therefore, during actual writing, a write operation is performed after the recording layer portion heated by a heat-assisting operation returns to the head position by making at least one circle.

Figure 6B:
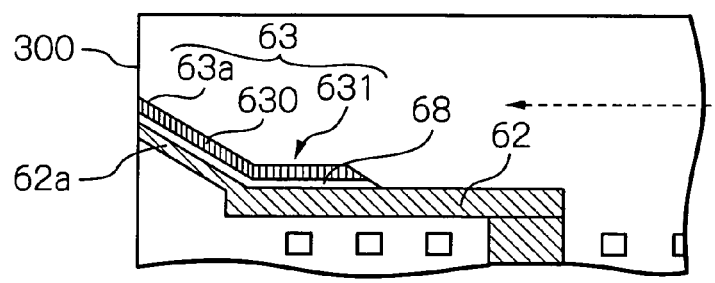

As shown in FIG. 6b, an end portion 62a of a main magnetic pole layer 62 and an NFL-generating portion 630 overlapped with each other is sloped in respect to the element-formed surface 31 in the form that portions in the head end surface 300 side of the overlapped portions 62a and 630 are lifted up, as is in the case with the first embodiment shown in FIG. 4a. However, in the alternative, a dielectric layer 68 formed of $SiO_2$ or an oxide that consists primarily of $SiO_2$ is inserted between the main magnetic pole layer 344 and the NFL-generating layer 63. As a result, the NFL-generating layer 63 is electrically isolated, and the isolated configuration can facilitate designing the NFL-generating portion 630 (especially the tip 63a) for exciting a large amount of localized plasmons. Therefore, a more sufficient heat-assisting operation can be performed because the intensity of the near-field light at a position much close to the tip 63a can be enhanced.

Figure 6C:
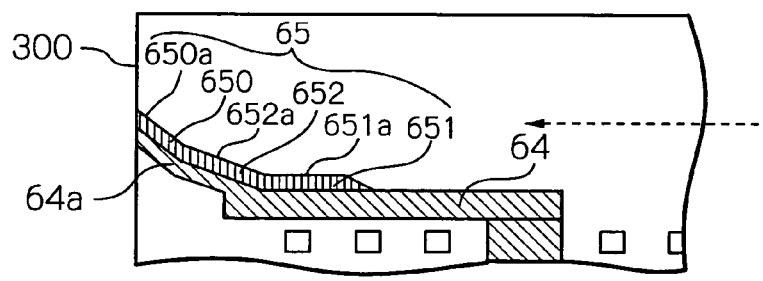

As shown in FIG. 6c, an end portion 64a of a main magnetic pole layer 64 and an NFL-generating portion 650 overlapped with each other is sloped in respect to the element-formed surface 31 in the form that portions in the head end surface 300 side of the overlapped portions 64a and 650 are lifted up, as is in the case with the first embodiment shown in FIG. 4a. However, in the alternative, the NFL-generating layer 65 is further provided with a second reflective portion 652 having a second reflecting surface 652a with a slope angle θ smaller than that of a light-received surface 650a and positioned between the NFL-generating portion 650 and the (first) reflective portion 651. The second reflecting surface 652a as well as the first reflecting surface 651a supplements the amount of light received on the light-received surface 650a by reflecting a part of the incident laser light that propagates across the head end surface 301, and by directing the reflected light toward the light-received surface 650a. Providing the two reflecting surfaces enables the light-received surface 650a to receive the laser light more sufficiently due to their focusing effect, which improves the efficiency of the near-field light generation.

Further, more than one reflective portion may be provided between the NFL-generating portion 650 and the first reflective portion 651. In the case, the slope angle θ of the each reflective portion preferably becomes larger in series from the first reflecting surface 651a toward the light-received surface 650a to enhance their focusing effect. Further, as a limit case of the much large number of the reflective portions, a structure in which the reflective portion has a curved reflecting surface the tangent slope of which increases toward the light-received surface is in the scope of the present invention.

Figure 6D:
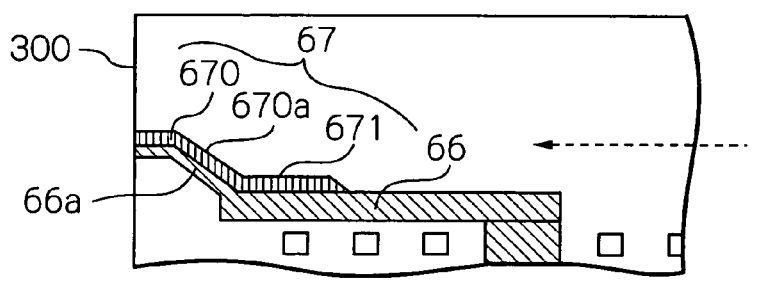

As shown in FIG. 6d, the end portion 66a of a main magnetic pole layer 66 and an NFL-generating portion 670 overlapped with each other is sloped in respect to the element-formed surface 31 in the form that portions in the head end surface 300 side of the overlapped portions 66a and 670 are lifted up, as is in the case with the first embodiment shown in FIG. 4a. However, in the alternative, the end portions in the head end surface 300 side of the overlapped portions 66a and 670 is bent to become parallel to the element-formed surface

31. As a result, the intensity of the write field close to the end portions parallel to the element-formed surface 31 can be sufficiently maintained due to avoidance of the decrease in the vertical component. And a required near-field light can be generated because a needed area of the light-received surface 670*a* is surely secured.

Figure 7A:
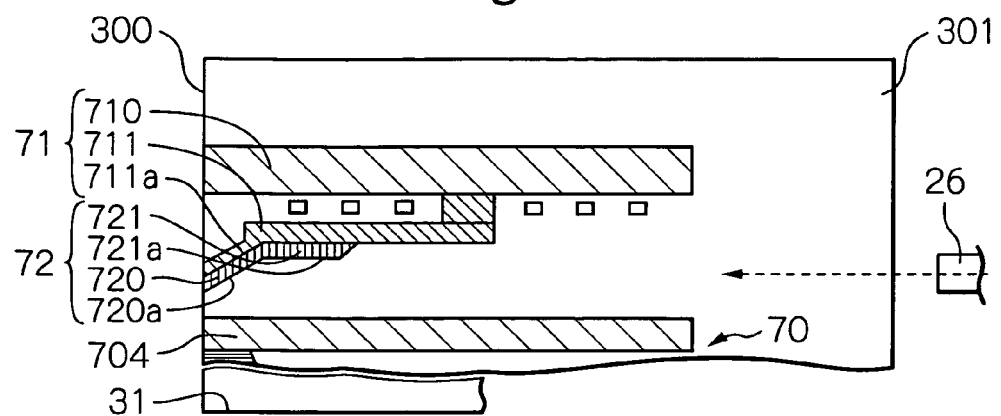
Figure 7A:
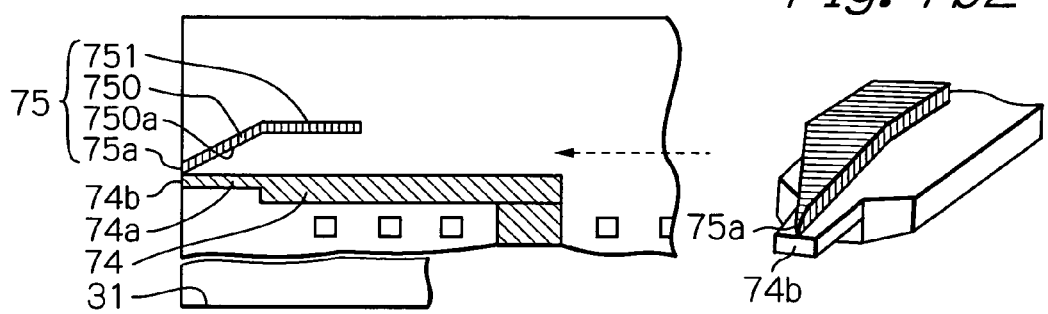
Figure 7A:
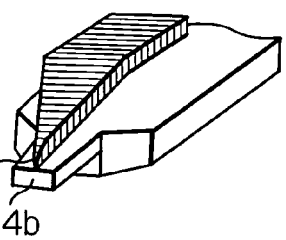
Figure 7A:
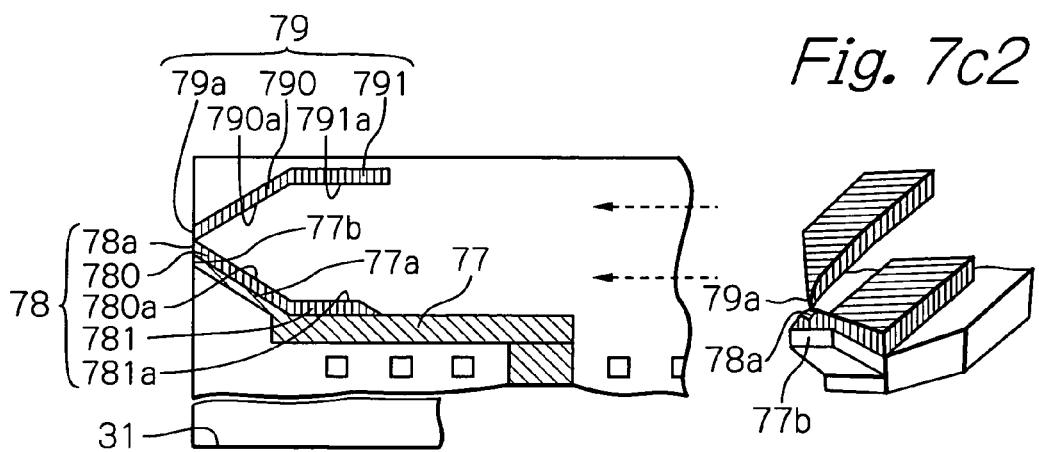
Figure 7A:
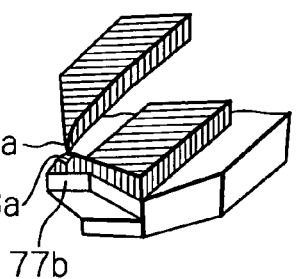

As shown in FIG. 7*a*, a main magnetic pole layer 711 is provided on the lower side (leading side) of an auxiliary magnetic pole layer 710, and an NFL-generating layer 72 is provided on the lower side (leading side) of the main magnetic pole layer 711. Further, an end portion 711*a* of the main magnetic pole layer 71 and an NFL-generating portion 720 overlapped with each other are sloped in respect to the element-formed surface 31 in the form that portions in the head end surface 300 side of the overlapped portions 711*a* and 720 are lifted up. In the alternative, a position on the head end surface 300 where the write field is generated is on the trailing side of and adjacent to a position where the near-field light is generated, and therefore, during actual writing, a write operation is performed surely to a portion of the recording layer just after a heat-assisting operation is performed to the portion of the recording layer.

In addition, in the alternative, the laser light from the optic fiber 26 is directed toward the light-received surface 720*a* positioned between the MR effect element 70 and the electromagnetic coil element 71. In this case, the upper surface of a upper shield layer 704 of the MR effect element 70, as well as a reflecting surface 721*a* of the NFL-generating layer 72, supplements the amount of light received on the light-received surface 720*a* by reflecting a part of the incident laser light and directing the reflected light toward the light-received surface 720*a*. Further, a reflective layer formed of Au, Al, Cu or an alloy of at least two of these elements may be independently provided on/above the upper surface of the upper shield layer 704.

As shown in FIG. 7*b*1, a light-received surface 750*a* of an NFL-generating portion 750 is sloped in respect to the element-formed surface 31 in the form that the portion in the head end surface 300 side of the light-received surface 750*a* is pulled down, and is provided in a position where an incident laser light propagating across the head end surface 301 can reach at least a part of the light-received surface 750*a*. And a main magnetic pole layer 74 is provided on the side of the light-received surface 750*a*, that is, on the leading side in relation to the near-field-generating layer 75. Further, the main magnetic pole layer 74 and the NFL-generating layer 75 are in contact with or much close to each other only at an end 74*b* on the head end surface 300 side of the main magnetic pole layer 74 and at a tip 75*a* on the head end surface 300 side of the NFL-generating layer 75. A configuration in which the end 74*b* and the tip 75*a* are contact with each other is shown in FIG. 7*b*2. In such a configuration, the write operation can be performed surely to a portion heat-assisted by the near-field light generated from the tip 75*a* of the recording layer, and furthermore, the intensity of the write field generated from the end 74*b* can be sufficiently maintained due to avoidance of the decrease in the vertical component by being sloped.

In addition, in the alternative, the laser light from the optic fiber 26 is directed toward a region between the main magnetic pole layer 74 and a reflective portion 751 of the NFL-generating layer 75. In this case, the upper surface of the main magnetic pole layer 74, as well as a reflecting surface 751*a*, supplements the amount of light received on the light-received surface 750*a* by reflecting a part of the incident laser light and directing the reflected light toward the light-received surface 750*a*. Further, a reflective layer formed of Au, Al, Cu or an alloy of at least two of these elements may be independently provided on/above the upper surface of the main magnetic pole layer 74.

As a further alternative, it is also preferable that a main magnetic pole layer may be provided on the lower side (on the leading side) of an auxiliary magnetic pole layer and an NFL-generating layer is provided on the lower side (on the leading side) of the main magnetic pole layer. It is evident that the alternative also brings the above-described effect.

As shown in FIG. 7*c*1, an end portion 77*a* of a main magnetic pole layer 77 and an NFL-generating portion 780 of a first NFL-generating layer 78 overlapped with each other is sloped in respect to the element-formed surface 31 in the form that portions in the head end surface 300 side of the overlapped portions 77*a* and 780 are lifted up. Further, in the alternative, a second NFL-generating layer 79 is provided on the upper side of the first NFL-generating layer 78, and an NFL-generating portion 790 of the second NFL-generating layer 79 is sloped in respect to the element-formed surface 31 in the form that the portion in the head end surface 300 side of the portion 790 is pulled down. The respective tips 78*a* and 79*a* reaching the head end surface 300 of the first and second NFL-generating layers 78 and 79 are positioned so as to have contact with or much close to each other.

In FIG. 7*c*2, shown is a configuration in which the tip 78*a* and an end 77*b* of the main magnetic pole layer 77 are contact with each other and the tips 78 and 79 are contact with each other. In such a configuration, a higher intensity of the near-field light can be obtained by combining the actions of the first and second NFL-generating layers 78 and 79, as well as the effect of the first embodiment shown in FIG. 4*a* can also be obtained. As a result, a more sufficient heat-assisting operation can be surely performed. Actually, the area for receiving light is increased as a sum of the both light-received surfaces, and at least one of the first and second NFL-generating layers 78 and 79 can be provided with an area satisfying the condition for generating the sufficient amount of near-field light, which facilitate a design for obtaining a higher intensity of the near-field light.

Especially, the second NFL-generating layer 79 is not in contact with any electric conductor such as a main magnetic pole layer and is surrounded by dielectric material such as an overcoat layer, namely electrically isolated. The isolated configuration can facilitate designing the NFL-generating layer 79 for exciting a large amount of localized plasmons.

In addition, in the alternative, the laser light from the optic fiber 26 is directed toward a region between a reflecting surface 781*a* of the first NFL-generating layer 78 and a reflecting surface 791*a* of the first NFL-generating layer 79. In this case, almost all of incident light directed toward the region except the attenuated amount can reach the light-received surface 780*a* or the light-received surface 790*a*, which more highly improves the efficiency of the near-field light generation.

As a further alternative, it is also preferable that a main magnetic pole layer may be provided on the lower side (on the leading side) of an auxiliary magnetic pole layer, a first NFL-generating layer may be provided on the lower side (on the leading side) of the main magnetic pole layer, and a second NFL-generating layer is provided on the lower side (on the leading side) of the first NFL-generating layer. It is evident that the alternative also brings the above-described effect.

Figure 8A:
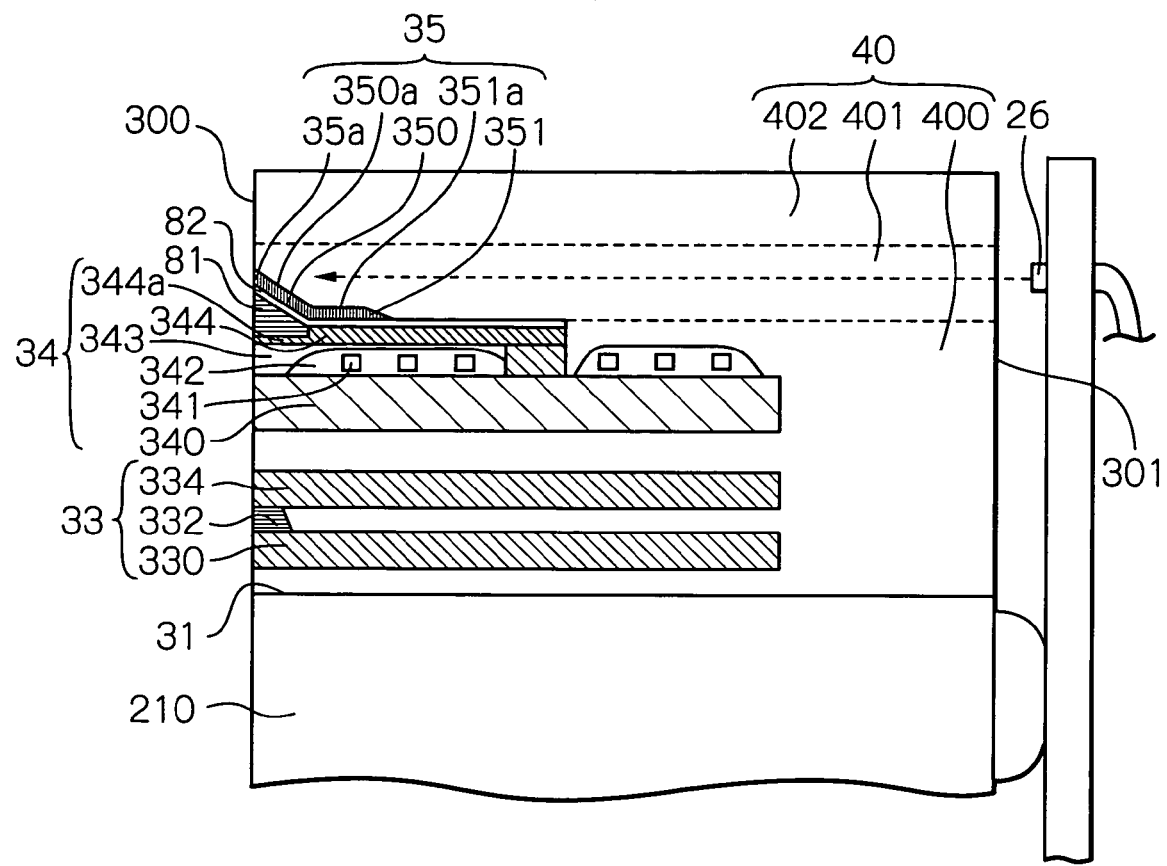
FIG. 8a shows a cross-sectional view taken along the line A-A in FIG. 3a schematically illustrating a major portion of the second embodiment of the thin-film magnetic head according to the present invention.

FIG. 8*a* shows a cross-sectional view taken along the line A-A in FIG. 3*a* schematically illustrating a major portion of the second embodiment of the thin-film magnetic head according to the present invention. The number of turns of the coil shown in FIG. 8a may be smaller than the actual one, for simplicity of drawings.

In FIG. 8a, the constituent materials and structures of an MR effect element 33, an electromagnetic coil element 34, an NFL-generating layer 35 and an overcoat layer 40 may be almost the same as the corresponding elements of the first embodiment shown in FIG. 4a, and therefore, the explanation of these elements is omitted below.

As shown in FIG. 8a, a thermal protrusion layer 81 is provided between an NFL-generating portion 350 of the NFL-generating layer 35 and an end portion 344a of the main magnetic pole layer 344, being much close to the NFL-generating portion 350 through an insulating layer 82 formed of $SiO_2$, $Al_2O_3$ and so on with thickness of approximately 3 nm to 20 nm, and being directly contact with the end portion 344a. Further, in the embodiment, the main magnetic pole layer 344 is positioned on the opposite side to a light-received surface 350a, that is, on the leading side in relation to the NFL-generating layer 35. Further, an insulating layer may be provided between the thermal protrusion layer 81 and the end portion 344a. The thermal protrusion layer 81 is formed of non-magnetic metal material such as Al, Cu, Au, Ti, Ta, Mo, W, Ru or an alloy of at least two selected from these elements which has a larger coefficient of thermal expansion than that of the insulating material such as $SiO_2$, $Al_2O_3$ of which the overcoat layer 40 is formed.

Figure 8B:
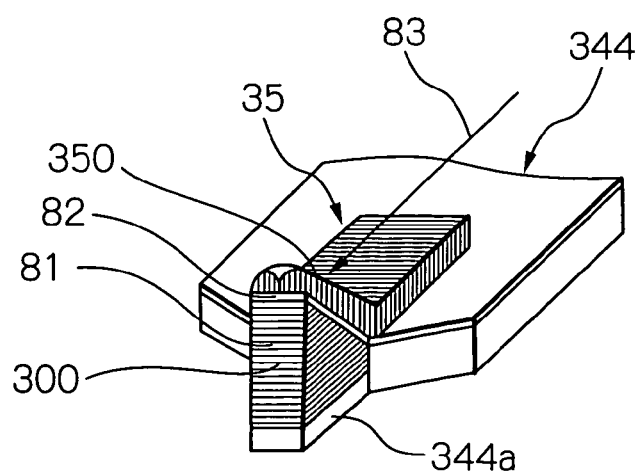
FIG. 8b shows a perspective view schematically illustrating the NFL-generating layer, the thermal protrusion layer and the main magnetic pole layer.

FIG. 8b shows a perspective view schematically illustrating the NFL-generating layer 35, the thermal protrusion layer 81 and the main magnetic pole layer 344.

As shown in FIG. 8b, a part of the near-field light generated from the NFL-generating layer 35 by the received laser light 83 heats the adjacent thermal protrusion layer 81. The thermal protrusion layer 81, which has a larger coefficient of thermal expansion as described above, expands largely by the heating, and especially its end surface on the head end surface 300 side is significantly protruded toward the magnetic disk. The tip of the NFL-generating layer 35 and the end of the main magnetic pole layer 344 are also protruded largely toward the magnetic disk by being dragged with the expanding thermal protrusion layer 81 or by expanding themselves thermally. The large protrusion of the tip of the NFL-generating layer 35 causes the near-field light to reach the recording layer of the magnetic disk more sufficiently, which enables the coercive force of the recording layer to be reduced to a required degree during write operation. Moreover, the large protrusion of the end of the main magnetic pole layer 344 causes a magnetic spacing, which is an effective magnetic distance between the end and the disk surface, to become smaller. As a result, the write field can sufficiently reach the recording layer, thus the writing efficiency can be improved.

Further, the NFL-generating layer 35, the thermal protrusion layer 81 and the main magnetic pole layer 344 are overlapped side by side along the track direction, and therefore, the part to be written of the recording layer (track) can be surely heated. Furthermore, the thermal protrusion layer 81 as well as the main magnetic pole layer 344 plays a role of a heatsink for preventing excess temperature rise of the NFL-generating portion 350.

In addition, in the embodiment, it should be noted that the end portion 344a of the main magnetic pole layer 344 is positioned on the leading side of the tip 35a of the NFL-generating portion 350, and therefore, during actual writing, a heat-assisting operation and a write operation are performed almost simultaneously, or a write operation is performed after the recording layer portion heated by the heat-assisting operation returns to the head position by making at least one circle.

Furthermore, the NFL-generating portion 350 is sloped in respect to the element-formed surface 31 in the form that the portion in the head end surface 300 side of the portion 350 is lifted up. When an angle θ' is defined as the slope angle, setting the slope angle θ' to a certain value brings the effect of the same kind as the effect of the slope angle θ shown in FIG. 5b in the first embodiment. Therefore, the θ' value can also be chosen from a certain range under one condition that the coercive force of the recording layer should be sufficiently reduced by the heat-assisting operation and the opposite condition that the heat-assisting portion and the writing portion on the head end surface 300 should be close to each other.

Figure 9A:
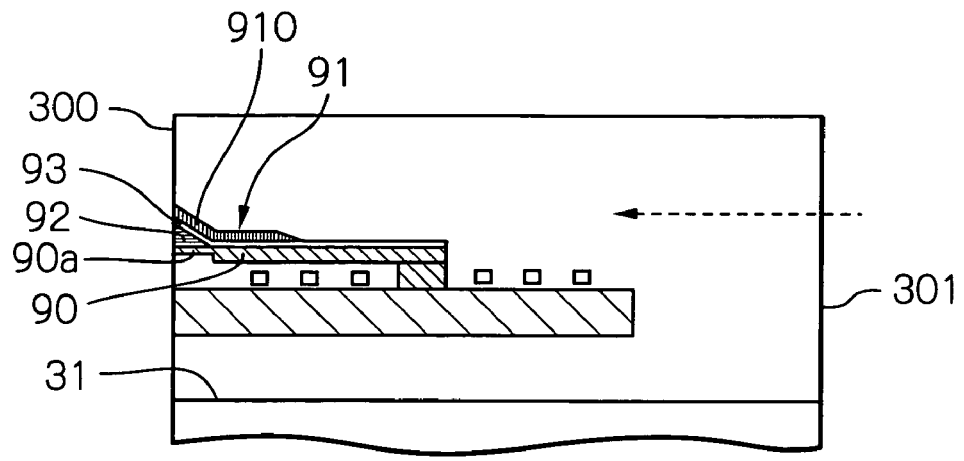
FIGS. 9a to 9c show cross-sectional views schematically illustrating various alternatives of the NFL-generating layer and the thermal protrusion layer in the second embodiment of the thin-film magnetic head according to the present invention.
Figure 9B:
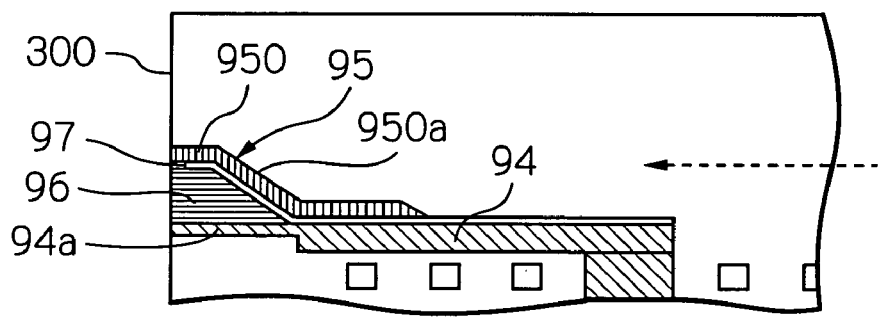
Figure 9C:
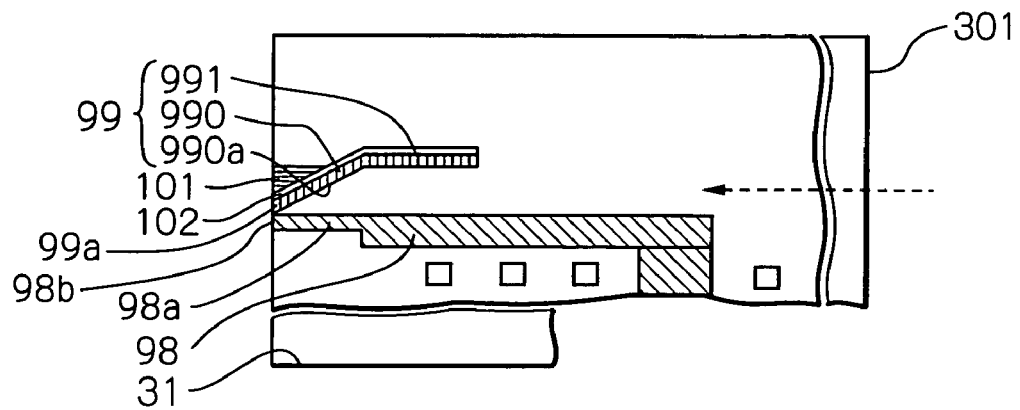

FIGS. 9a to 9c show cross-sectional views schematically illustrating various alternatives of the NFL-generating layer and the thermal protrusion layer in the second embodiment of the thin-film magnetic head according to the present invention.

As shown in FIG. 9a, a thermal protrusion layer 92 is provided between an end potion 90a of a main magnetic pole layer 90 and an NFL-generating portion 910 of an NFL-generating layer 91, and is much close to the NFL-generating portion 910 through an insulating layer 93. Further, in this alternative, the end portion 90a is provided closer to the NFL-generating portion 910 than the end portion 344a shown in FIG. 8a, and the upper surface of the end portion 90a is flush with the upper surface of the main magnetic pole layer 90. Therefore, the stability of writing operation and the writing efficiency becomes more significantly improved because the distance between the heat-assisting portion and the writing portion on the head end surface 300 becomes smaller.

As shown in FIG. 9b, a thermal protrusion layer 96 is provided between an end potion 94a of a main magnetic pole layer 94 and an NFL-generating portion 950 of an NFL-generating layer 95, and is much close to the NFL-generating portion 950 through an insulating layer 97, as is the embodiment shown in FIG. 8a. However, in this alternative, the end portion in the head end surface 300 side of the NFL-generating portion 950 is bent to become parallel to the element-formed surface 31. As a result, a required near-field light can be generated because a needed area of the light-received surface 950a of the NFL-generating portion 950 is surely secured, and the stability of writing operation and the writing efficiency becomes more significantly improved because the distance between the heat-assisting portion and the writing portion on the head end surface 300 becomes smaller.

As shown in FIG. 9c, a light-received surface 990a of an NFL-generating portion 990 is sloped in respect to the element-formed surface 31 in the form that the portion in the head end surface 300 side of the light-received surface 990a is pulled down, and is provided in a position where an incident laser light propagating across the head end surface 301 can reach at least a part of the light-received surface 990a. And a main magnetic pole layer 98 is provided on the side of the light-received surface 990a, that is, on the leading side in relation to the near-field-generating layer 99. Further, the main magnetic pole layer 98 and the NFL-generating layer 99 are in contact with or much close to each other only at an end 98b in the head end surface 300 side of the main magnetic pole layer 98 and at a tip 99a in the head end surface 300 side of the NFL-generating layer 99. Further, a thermal protrusion layer 101 is provided in a position on the opposite side to the main magnetic pole layer 98 in relation to the NFL-generating portion 990 and much close to the NFL-generating portion 990 through an insulating layer 102. In such a configuration, by using a near-field light generated from the tip 99a of the NFL-generating portion 990, the heat-assisting operation can be surely performed to the recording layer of the magnetic disk. Furthermore, the end portion 98a and the tip 99a can be protruded sufficiently because the center of protrusion of the thermal protrusion layer 101 becomes much close to both of the end portion 98a and the tip 99a. As a result, the stability of writing operation and the writing efficiency becomes more significantly improved.

In addition, in the alternative, the laser light from the optic fiber 26 is directed toward a region between the main magnetic pole layer 98 and a reflective portion 991 of the NFL-generating layer 99. In this case, the upper surface of the main magnetic pole layer 98, as well as a reflecting surface 991a, supplements the amount of light received on the light-received surface 990a by reflecting a part of the incident laser light and directing the reflected light toward the light-received surface 990a. Further, a reflective layer formed of Au, Al, Cu or an alloy of at least two of these elements may be independently provided on/above the upper surface of the main magnetic pole layer 98.

Further, as further alternatives to those shown in FIGS. 9a to 9c, it is also preferable that a main magnetic pole layer may be provided on the lower side (on the leading side) of an auxiliary magnetic pole layer and an NFL-generating layer is provided on the lower side (on the leading side) of the main magnetic pole layer. It is evident that these alternatives also bring the above-described effects. It should be noted that, during writing in the cases, a write operation is performed stably and efficiently to a portion of the recording layer just after a heat-assisting operation is performed to the portion of the recording layer.

Figure 10A:
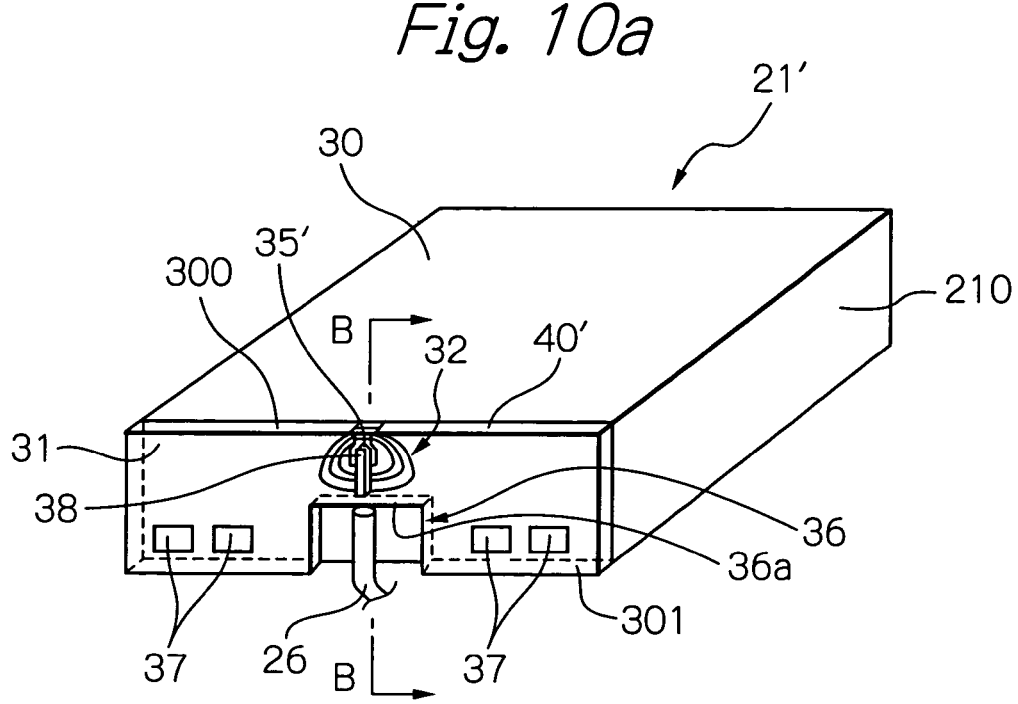
FIG. 10a shows a perspective view of a third embodiment of the thin-film magnetic head provided on the end portion of the HGA shown in FIGS. 2a and 2b.
Figure 10B:
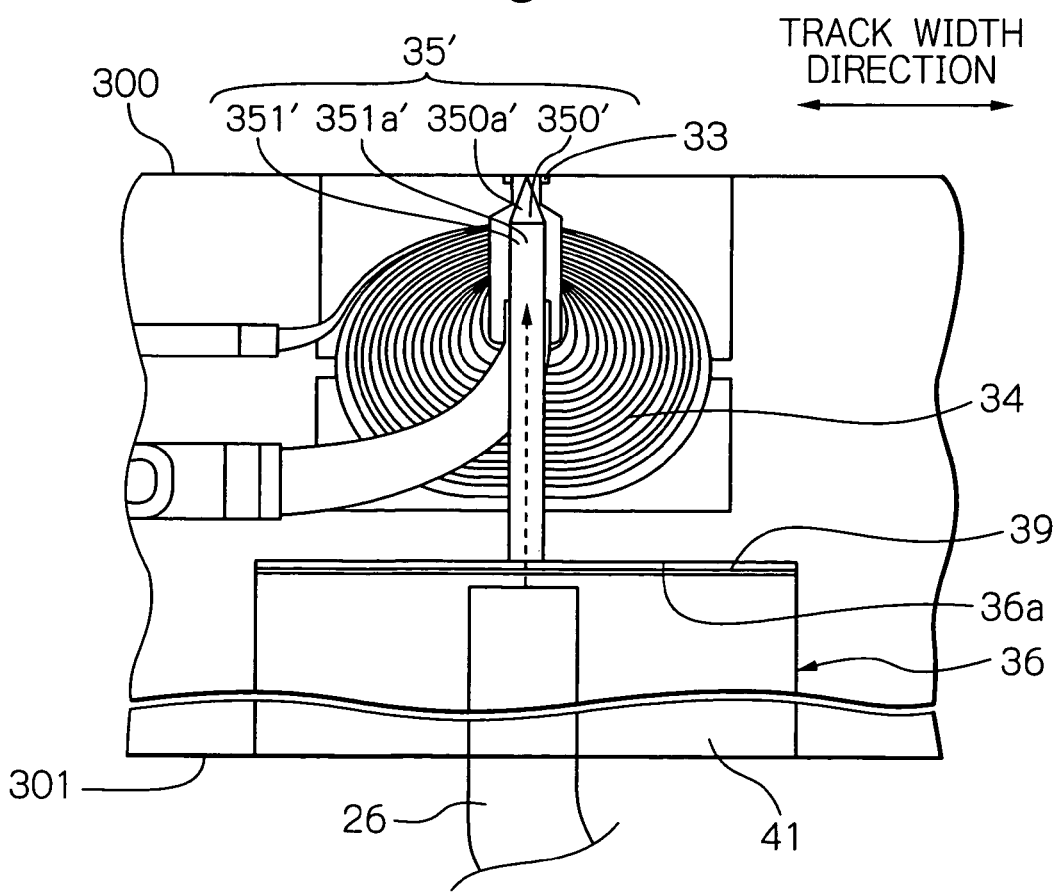

FIG. 10a shows a perspective view of a third embodiment of the thin-film magnetic head provided on the end portion of the HGA shown in FIGS. 2a and 2b, and FIG. 10b shows a plain view schematically illustrating a magnetic head element shown in FIG. 10a. For viewability, a reflective layer 38 shown in FIG. 10a is omitted in FIG. 10b.

As shown in FIG. 10a, the thin-film magnetic head (slider) 21' is provided with a slider substrate 210 having an ABS 30 as an opposed-to-medium surface for obtaining an appropriate flying height and an element-formed surface 31 perpendicular to the ABS 30, a magnetic head element 32 formed above/on the element-formed surface 31, an NFL-generating layer 35' for generating a near-field light used for the heat-assisted magnetic recording, a reflective layer 38 provided above the NFL-generating layer 35', an overcoat layer 40' formed on the element-formed surface 31 so as to cover the magnetic head element 32, the NFL-generating layer 35' and the reflective layer 38, a cavity 36 formed in the region in the opposite side to the ABS 30 of the overcoat layer 40', and four signal electrodes 37 exposed on the surface of the overcoat layer 40'. The magnetic head element 32 includes an MR effect element 33 (shown in FIG. 10b) for reading data signals and an electromagnetic coil element 34 (shown in FIG. 10b) for writing data signals. Respective two of the four signal electrodes 37 are connected with the MR effect element 33 and the electromagnetic coil element 34. The number and positions of the electrodes are not limited to the embodiment shown in FIG. 10a. In the embodiment, there are four electrodes, however it is also possible to provide three electrodes and a ground connected to the slider substrate.

The cavity 36 is formed in a region of the overcoat layer 40' opposite to the ABS 30 and reaching the head end surface 301 opposite to the head end surface 300 opposed to the disk. The cavity 36 has a light-received wall surface 36a recessed from the head end surface 301 toward the side of the NFL-generating layer 35' (the head end surface 300 side). That is to say, the light-received wall surface 36a is parallel to the head end surface 301, and provided closer to the NFL-generating layer 35' (the head end surface 300) than the head end surface 301.

The end portion of the optic fiber 26 for launching a laser light toward the NFL-generating layer 35' is inserted to the cavity 36 from the head end surface 301 side. The inserted end surface of the optic fiber 26 is opposed to or has surface contact with the light-received wall surface 36a, and the laser light from the optic fiber 26 propagates across the light-received wall surface 36a toward the NFL-generating layer 35'. That is, the light-received wall surface 36a receives and allows passage of the laser light. In this embodiment, the end surface of the optic fiber 26 is positioned closer to the NFL-generating layer 35', and therefore, the laser light can reach the NFL-generating layer 35' with lower propagation loss, compared to the case in which a light propagates across the head end surface 301 without a cavity.

As shown in FIG. 10b, one ends of the MR effect element 33 and the electromagnetic coil element 34 reach the head end surface 300 on the ABS 30 side. During write and read operations, the thin-film magnetic head 21' hydrodynamically flies with a predetermined flying height above a rotating magnetic disk, and the one ends of the elements become opposed to the surface of the magnetic disk, then the head 21' performs a read operation by sensing signal fields from the magnetic disk and a write operation by applying signal fields to the magnetic disk.

The NFL-generating layer 35' is provided, in this embodiment, on the electromagnetic coil element 34, and has a shape tapered toward the head end surface 300 opposed to the magnetic disk. The NFL-generating layer 35' includes an NFL-generating portion 350' for generating the near-field light by receiving a laser light from the optic fiber 26, and a reflective portion 351' having a reflecting surface 351a' for directing the laser light from the optic fiber 26 to the NFL-generating portion 350'.

The NFL-generating portion 350' includes a tip reaching the head end surface 300, and has, for example, an isosceles triangle shape, and is provided with a light-received surface 350a'. When a laser light from the optic fiber 26 is applied to the light-received surface 350a', a near-field light with extraordinary high intensity of its electric field is generated from the tip reaching the head end surface 300. The generated near-field light enables a heat-assisting operation to be performed.

The light-received wall surface 36a of the cavity 36 is provided on the rear side of the electromagnetic coil element 34 when viewing from head end surface 300 side and in a position sufficiently close to the electromagnetic coil element 34 and further the NFL-generating portion 350'. On the light-received wall surface 36a, an antireflective film 39 may be formed to reduce the loss due to the reflection of a part of the light from the optic fiber 26 on the light-received wall surface 36a. The antireflective film 39 has a monolayer structure formed of, for example, $Ta_2O_3$ or $SiO_2$ by means of an ion-assisted evaporation method, or a multilayered structure in which, for example, a $Ta_2O_3$ film and a $SiO_2$ Film are alternately deposited by means of the ion-assisted evaporation method. These structures are designed optically in dependence on the wavelength of the incident laser light.

Here, the cavity 36 is formed, as described later, by being etched by means of, for example, a wet etching, and then, the bottom surface formed by the etching becomes an exposed surface of a stop layer 41 described later.

Figure 11:
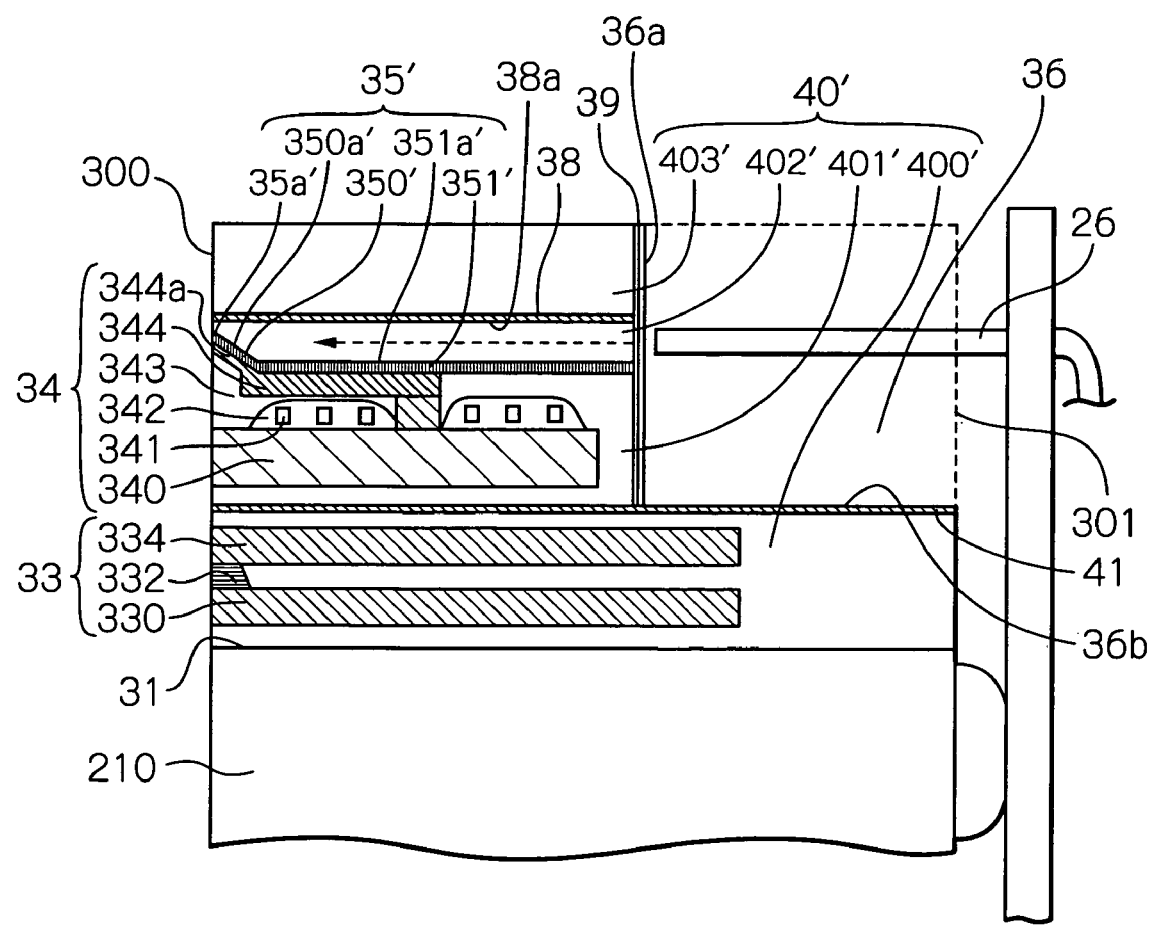
FIG. 11 shows a cross-sectional view taken along the line B-B in FIG. 10a schematically illustrating a major portion of the third embodiment of the thin-film magnetic head according to the present invention.

FIG. 11 shows a cross-sectional view taken along the line B-B in FIG. 10a schematically illustrating a major portion of the third embodiment of the thin-film magnetic head according to the present invention. The number of turns of the coil shown in FIG. 11 may be smaller than the actual one, for simplicity of drawings.

In FIG. 11, the constituent materials and structures of an MR effect element 33 and an electromagnetic coil element 34 may be almost the same as the corresponding elements of the first embodiment shown in FIG. 4a, and therefore, the explanation of these elements is omitted below.

As shown in FIG. 11, the NFL-generating layer 35' includes the reflective portion 351' and the NFL-generating portion 350' formed of Au, Pd, Pt, Rh, Ir or an alloy of at least two selected from these elements, or the alloy to which Al, Cu, etc. is added. The light-received surface 350a' of the NFL-generating portion 350' is sloped in respect to the element-formed surface 31 in the form that the portion in the head end surface 300 side of the surface 350a' is lifted up, and is provided in a position where a laser light from the optic fiber 26 can reach at least a part of the light-received surface 350a' across the head end surface 301. Here, the actual heat-assisting operation by using the NFL-generating layer 35' may be almost the same as the heat-assisting operation by using the NFL-generating layer 35 shown in FIG. 4a, and therefore, is omitted to be explained.

The reflective portion 351' is provided in a position opposite to the head end surface 300 in relation to the NFL-generating portion 350', and has the reflecting surface 351a' parallel to the element-formed surface 31. The reflecting surface 351a' is extended to the light-received wall surface 36a with a width in the track width direction of, for example, approximately 20 μm to 500 μm. The reflecting surface 351a' supplements the amount of light received on the light-received surface 350a' by reflecting a part of the incident laser light that propagates from the optic fiber 26 across the light-received wall surface 36a, and by directing the reflected light toward the light-received surface 350a', which improves the efficiency of the near-field light generation.

The possible ranges of the size of the NFL-generating layer 35' are almost the same as those of the NFL-generating layer 35 shown in FIG. 4a, and therefore, is omitted to be described.

The reflective layer 38 is provided on the light-received surface 350a' side (on the upper side) of the NFL-generating layer 35', being parallel with the element-formed surface 31 and extended to the light-received wall surface 36a. The reflective layer 38 has a reflecting surface 38a, which corresponds to a third reflecting surface when the reflecting surface 351a' is defined as a first reflecting surface and the reflecting surface 652a shown in FIG. 6c is defined as a second reflecting surface. The reflecting surface 38a further supplements the amount of light received on the light-received surface 350a' by reflecting a part of the incident laser light that propagates from the optic fiber 26 across the light-received wall surface 36a, and by directing the reflected light toward the light-received surface 350a', which more significantly improves the efficiency of the near-field light generation. The reflective layer 38 is formed of, for example, Au, Al, Cu or an alloy of at least two selected from these elements with thickness of, for example, approximately 50 nm to 500 nm and with the width in the track width direction of, for example, approximately 10 μm to 500 μm.

The stop layer 41 is a layer for defining the end point of the etching of the overcoat layer 40' for forming the cavity 36, and is formed of metal material such as Ta, Ti. The stop layer 41 is extended from a region between the MR effect element 33 and the electromagnetic coil element 34 to the head end surface 301 with the width in the track width direction of, for example, approximately 5 μm to 800 μm larger than the width in the track width direction (approximately 5 μm to 600 μm) of the cavity 36. The thickness of the stop layer 41 is, for example, approximately 5 nm to 200 nm.

A part of the upper layer of the stop layer 41 becomes a bottom surface 36b exposed by the etching for making the cavity 36. The bottom surface 36b is positioned above a region on the rear side of the MR effect element 33 when viewing from the head end surface 300 side. Therefore, the height (the length in the direction perpendicular to the head end surface 300) of the upper and lower shield layers 334 and 330 of the MR effect element 33 can be set in a wide range. For example, the ends opposite to the head end surface 300 of the upper and lower shield layers 334 and 330 may be in a region below the bottom surface 36b.

The overcoat layer 40' is formed on the element-formed surface 31 so as to cover the MR effect element 33, electromagnetic coil element 34, the NFL-generating layer 35' and the reflective layer 38. The overcoat layer 40' has a layered structure in the stacking direction (the direction perpendicular to the surface 31) of a first overcoat layer 400' ranging from the element-formed surface 31 to the stop layer 41, a second overcoat layer 401' ranging from the stop layer 41 to the upper surface of the main pole magnetic layer 344 except its end portion 344a, a third overcoat layer 402' ranging from the upper surface to the reflective layer 38, and a fourth overcoat layer 403' occupying the region on the reflective layer 38.

The third overcoat layer 402' includes all the light paths of the incident laser light from the light-received wall surface 36a to the light-received surface 350a', and is formed of $SiO_2$ (silicon dioxide) or an oxide that consists primarily of $SiO_2$, which has a sufficient high transmittance for the laser light generated from the semiconductor laser oscillator 18 (FIG. 1). The third overcoat layer 402' enables the incident laser light to be much less attenuated, and therefore, improves the efficiency of the generation of the near-field light due to the increase in the amount of light received on the light-received surface 350a'. The first, second and fourth overcoat layers 400', 401' and 403' may be formed of, for example, $Al_2O_3$ as usually used for overcoat. The third overcoat layer 402' may be a layer with a predetermined width in the track width direction, under the condition of including the light paths. In the case, by forming alumina layers on both sides in the track width direction of the third overcoat layer, the mechanical strength of the overcoat layer 40' can be sufficiently maintained due to the enhancement of the adhesion strength between the second and fourth overcoat layers.

The main magnetic pole layer 344 is provided in a position on the opposite side to the light-received surface 350a', that is, on the leading side of the NFL-generating layer 35'. Further, the end portion 344a of the main magnetic pole layer 344 and the NFL-generating portion 350' are overlapped directly with each other. The overlapped structure may be almost the same as that of the first embodiment shown in FIG. 4b.

Figure 12A:
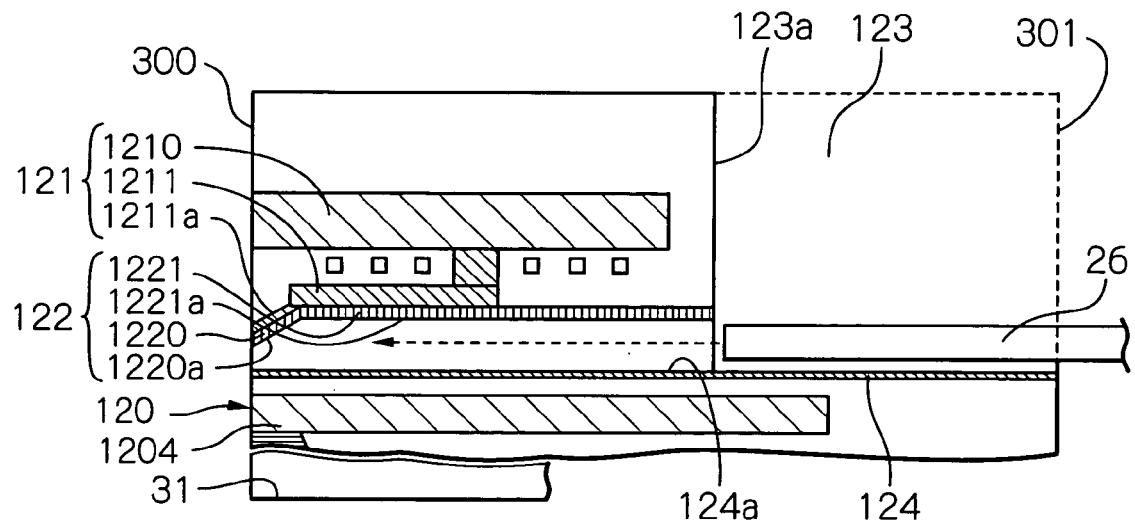
FIGS. 12a to 12c show cross-sectional views and perspective views schematically illustrating various alternatives of the NFL-generating layer, the reflective layer and the cavity in the third embodiment of the thin-film magnetic head according to the present invention.
Figure 12B:
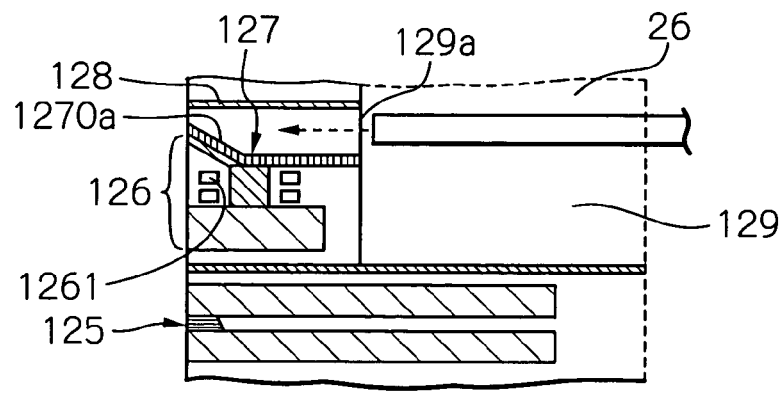
Figure 12C:
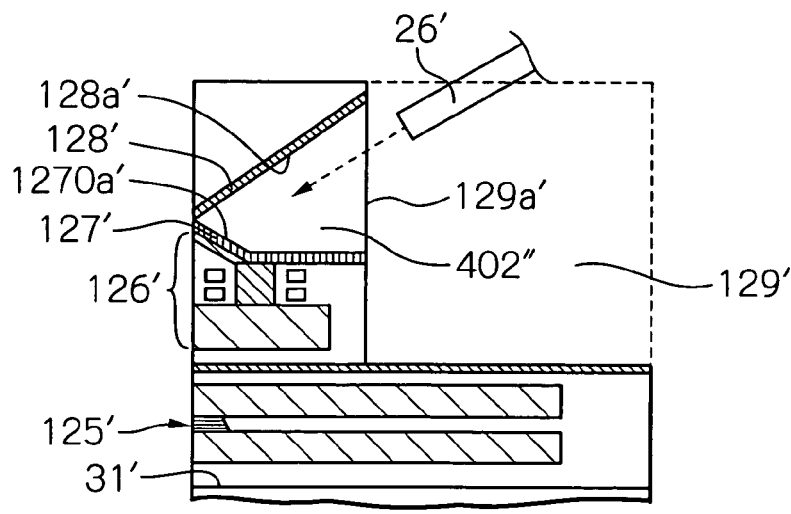

FIGS. 12a to 12c show cross-sectional views and perspective views schematically illustrating various alternatives of the NFL-generating layer, the reflective layer and the cavity in the third embodiment of the thin-film magnetic head according to the present invention.

As shown in FIG. 12a, in an electromagnetic coil element 121, a main magnetic pole layer 1211 is provided on the lower side (on the leading side) of an auxiliary magnetic pole layer 1210, and an NFL-generating layer 122 is provided on the lower side (on the leading side) of the main magnetic pole layer 1211. An end portion 1211a of the main magnetic pole layer 1211 and an NFL-generating portion 1220 overlapped with each other is sloped in respect to the element-formed surface 31 in the form that portions in the head end surface 300 side of the overlapped portions 1211a and 1220 are lifted up. Further, a stop layer 124 is parallel to the element-formed surface 31, and is extended from a region between the MR effect element 120 and the NFL-generating layer 122 to the head end surface 301. In the alternative, a position on the head end surface 300 where the write field is generated is on the trailing side of and adjacent to a position where the near-field light is generated, and therefore, during actual writing, a write operation is performed surely to a portion of the recording layer just after a heat-assisting operation is performed to the portion of the recording layer.

In addition, in the alternative, the laser light from the optic fiber 26 is directed toward a light-received surface 1220a of the NFL-generating layer 122 in a region between the stop layer 124 and the electromagnetic coil element 121. In this case, the upper surface 124a of the stop layer 124, as well as a reflecting surface 1221a of the NFL-generating layer 122, supplements the amount of light received on the light-received surface 1220a by reflecting a part of the incident laser light and directing the reflected light toward the light-received surface 1220a. For the reason, the stop layer 124 is formed of, for example, Ta, Ti, etc. that has a low etching rate and a sufficiently high reflectance ratio for laser light. Further, a reflective layer formed of Au, Al, Cu or an alloy of at least two of these elements may be independently provided on/above the upper surface of the stop layer 124.

As shown in FIG. 12b, the positional relation among an MR effect element 125, an electromagnetic coil element 126, an NFL-generating layer 127 and a reflective layer 128 may be almost the same as that of the third embodiment shown in FIG. 11. However, in the alternative, the electromagnetic coil element 126 has a short-magnetic-path structure, that is, its height (length in the direction perpendicular to the head end surface 300) becomes rather small, and therefore, a light-received wall surface 129a becomes closer to a light-received surface 1270a of an NFL-generating layer 127. As a result, a propagation loss of the laser light propagating from the light-received wall surface 129a to the light-received surface 1270a becomes smaller, and therefore, the efficiency of the near-field light generation becomes more significantly improved.

Here, the short-magnetic-path structure of an electromagnetic coil element is a structure in which its height is set to become significantly smaller than conventional, and the looped magnetic path of magnetic flux exciting in the magnetic pole layers becomes shorter, which corresponds to a smaller inductance of the electromagnetic coil element. Therefore, the short-magnetic-path structure can respond the higher frequency of the write current which is inevitable for the improvement of recording density. Actually, this structure is accompanied by adjustments of such as an aspect ratio of the cross-section of the write coil layer and the number of the write coil layers.

As shown in FIG. 12c, the positional relation among an MR effect element 125', an electromagnetic coil element 126' having a short-magnetic-path structure, and an NFL-generating layer 127' may be almost the same as that of the alternative shown in FIG. 12b. However, in this alternative, a reflective layer 128' is sloped in respect to the element-formed surface 31'. A reflecting surface (a third reflecting surface) 128a' of the sloped reflective layer 128' supplements the amount of light received on the light-received surface 1270a' by reflecting a part of the incident laser light propagating from the optic fiber 26' and obliquely across a light-received wall surface 129a', and by directing the reflected light toward the light-received surface 1270a', which improves the efficiency of the near-field light generation. In the case, the laser light can be applied to the light-received surface 1270a' mainly with an incident angle of 90° (degrees) or an incident angle close to 90°, which more significantly improves the efficiency of the near-field light generation. Further, in the alternative, a region 402" between the NFL-generating layer 127' and the sloped reflective layer 128' is preferably filled with $SiO_2$ (silicon dioxide) or an oxide that consists primarily of $SiO_2$ having a sufficient high transmittance for the laser light as a third overcoat layer 402".

Figure 13A:
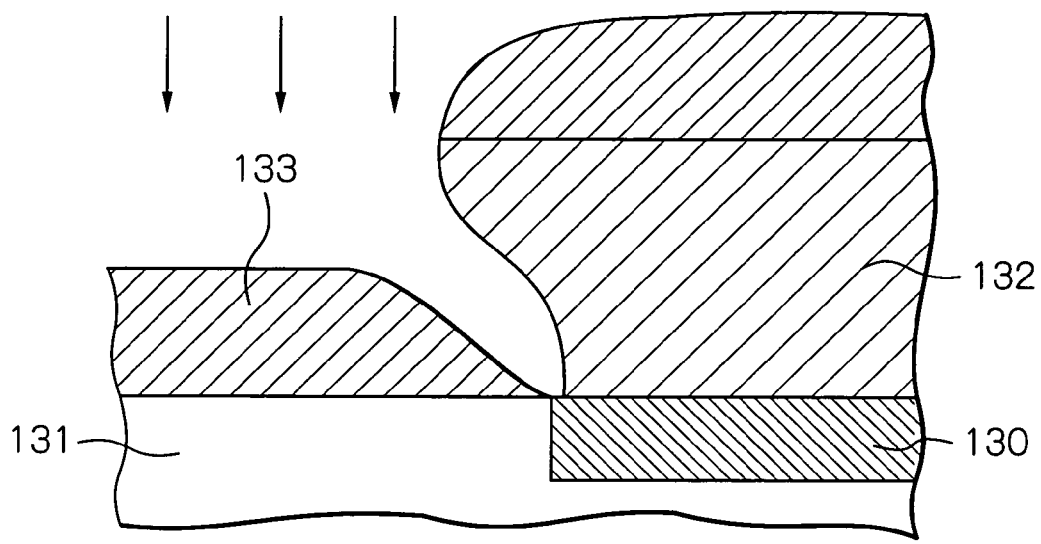
FIGS. 13a to 13c show cross-sectional views explaining an embodiment of the manufacturing process of the end portion of the main magnetic pole layer and the NFL-generating portion in the first embodiment of the thin-film magnetic head according to the present invention.
Figure 13B:
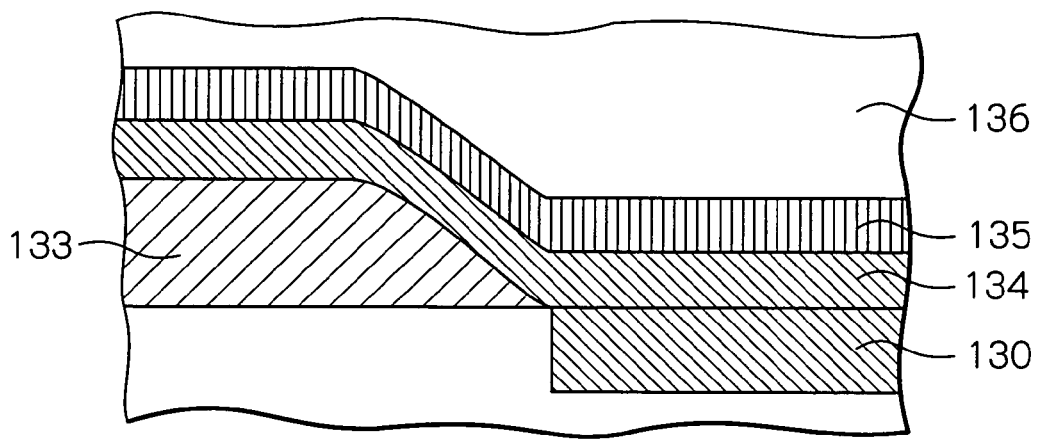
Figure 13C:
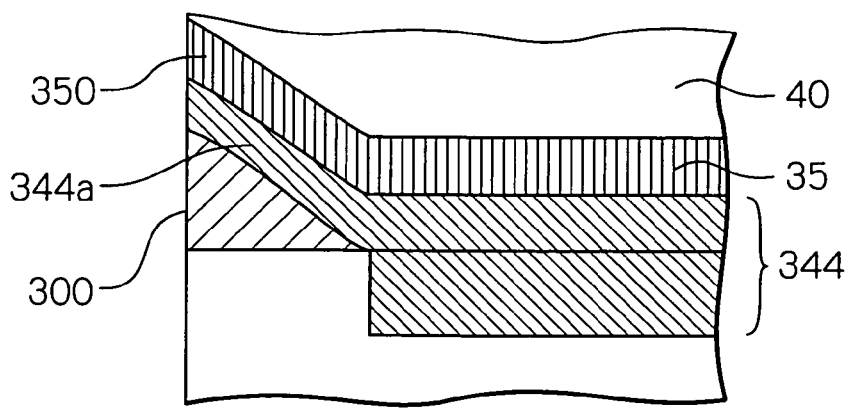

FIGS. 13a to 13c show cross-sectional views explaining an embodiment of the manufacturing process of the end portion of the main magnetic pole layer and the NFL-generating portion in the first embodiment of the thin-film magnetic head according to the present invention. Specifically, these figures sequentially show manufacturing steps of the end portion 344a of the main magnetic pole layer 344 and the NFL-generating portion 350 shown in FIG. 4a.

As shown in FIG. 13a, first, a magnetic film to become a main magnetic pole layer is deposited, and a base part 130 of the main magnetic pole layer and a planarized layer 131 are formed with their upper surfaces flush by depositing a dielectric film such as $SiO_2$ and planarizing the deposited magnetic film and the deposited dielectric film by means of, for example, a chemical mechanical polishing (CMP). Next, a resist pattern 132 used for a lift-off method is formed on the base part 130 of the main magnetic pole layer, and then, a dielectric film made of such as $SiO_2$ is deposited by, for example, a sputtering technique to form an insulating layer 133 having a sloped side surface. After that, the resist pattern 132 and the dielectric film thereon are removed (lifted off).

Then, as shown in FIG. 13b, a magnetic layer 134 to become the end potion of the main magnetic pole layer and a layer 135 to become the NFL-generating layer are formed on the base part 130 and the insulating layer 133. The layer 135 is made of, for example, Au, Pd, Pt, Rh, Ir or an alloy of at least two selected from these elements, or the alloy to which Al, Cu, etc. is added. Further, a dielectric film 136 to become an overcoat layer is deposited thereon.

After the thin-film process that includes the above-described steps is finished, a wafer substrate as the slider substrate is cut into a plurality of row bars in which a plurality of the magnetic head elements is aligned. Then, an MR height process is performed to obtain a desired MR height by rapping the row bar. After that, the row bar that underwent the MR height process is cut to be separated into a plurality of sliders (thin-film magnetic heads), and the manufacturing process of the thin-film magnetic head is completed.

Here, as shown in FIG. 13c, the forming process of the main magnetic pole layer 344, the NFL-generating layer 35 and the overcoat layer 40 are completed by polishing the magnetic layer 134, the layer 135 and the dielectric layer 136 in the above-described MR height process. And the end portion 344a and the NFL-generating portion 350 becomes sloped in respect to the element-formed surface as a result of being formed on the sloped side surface of the insulating layer 133.

Figure 14A:
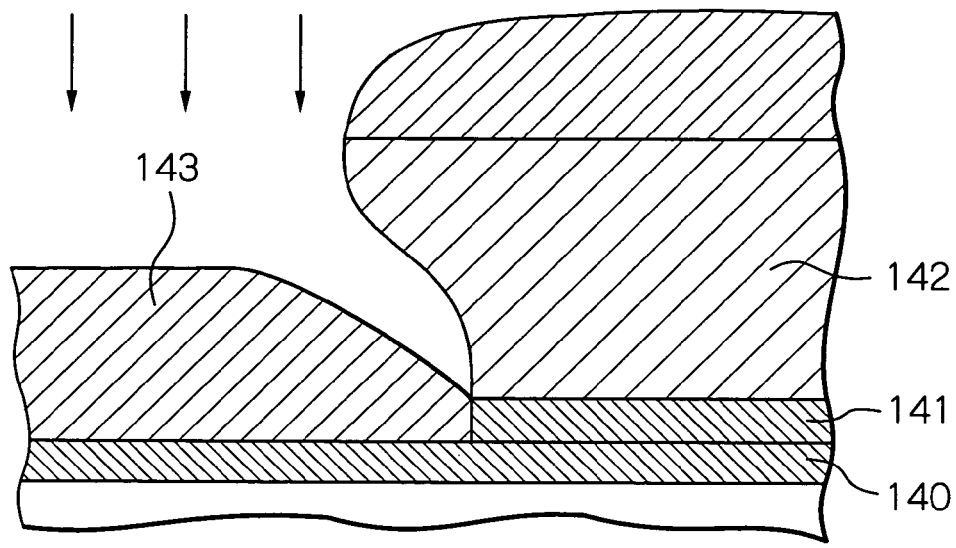
FIGS. 14a to 14c show cross-sectional views explaining an embodiment of the manufacturing process of the thermal protrusion layer and the NFL-generating portion in the second embodiment of the thin-film magnetic head according to the present invention.
Figure 14B:
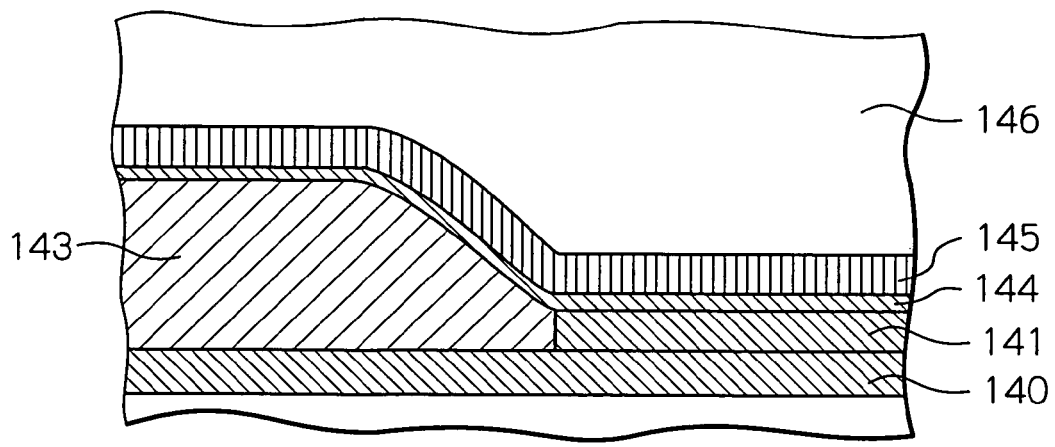
Figure 14C:
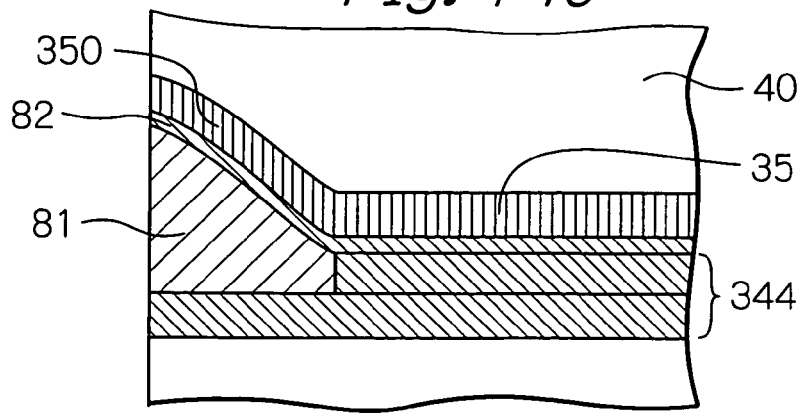

FIGS. 14a to 14c show cross-sectional views explaining an embodiment of the manufacturing process of the thermal protrusion layer and the NFL-generating portion in the second embodiment of the thin-film magnetic head according to the present invention. Specifically, these figures sequentially show manufacturing steps of the thermal protrusion layer 52 and the NFL-generating portion 350 shown in FIG. 8a.

As shown in FIG. 14a, first, a main-magnetic-pole central film 140, and then a main-magnetic-pole assistant film 141 are formed. Here, the end portion of the main-magnetic-pole central film 140 will become the end portion in the head end surface side of the main magnetic pole layer. Next, a resist pattern 142 used for a lift-off method is formed on the main-magnetic-pole assistant film 141, and then, a non-magnetic metal film made of such as Al, Cu. Au, Ti, Ta, Mo, W, Ru or an alloy of at least two selected from these elements is deposited by, for example, a sputtering technique to form an thermal protrusion film 143 having a sloped side surface. After that, the resist pattern 142 and the non-magnetic metal film thereon are removed (lifted off).

Then, as shown in FIG. 14b, an insulating film 144 made of, for example, $SiO_2$, $Al_2O_3$ and so on and an NFL-generating film 145 to become the NFL-generating layer are formed on the main-magnetic-pole assistant film 141 and the thermal protrusion film 143. The NFL-generating film 145 is made of, for example, Au, Pd, Pt, Rh, Ir or an alloy of at least two selected from these elements, or the alloy to which Al, Cu, etc. is added. Further, a dielectric film 146 to become an overcoat layer is deposited thereon.

After the thin-film process that includes the above-described steps is finished, a wafer substrate as the slider substrate is cut into a plurality of row bars in which a plurality of the magnetic head elements is aligned. Then, an MR height process is performed to obtain a desired MR height by rapping the row bar. After that, the row bar that underwent the MR height process is cut to be separated into a plurality of sliders (thin-film magnetic heads), and the manufacturing process of the thin-film magnetic head is completed.

Here, as shown in FIG. 14c, the forming process of the main magnetic pole layer 344, the thermal protrusion layer 81, the insulating layer 82, the NFL-generating layer 35 and the overcoat layer 40 are completed by polishing the main-magnetic-pole central film 140, the thermal protrusion film 143, the insulating film 144, the NFL-generating film 145 and the dielectric film 146 in the above-described MR height process. And the NFL-generating portion 350 becomes sloped in respect to the element-formed surface as a result of being formed on the sloped side surface of the thermal protrusion film 143.

FIGS. 15a to 15d show cross-sectional views explaining an embodiment of the manufacturing process of the cavity in the third embodiment of the thin-film magnetic head according to the present invention.

Figure 15A:
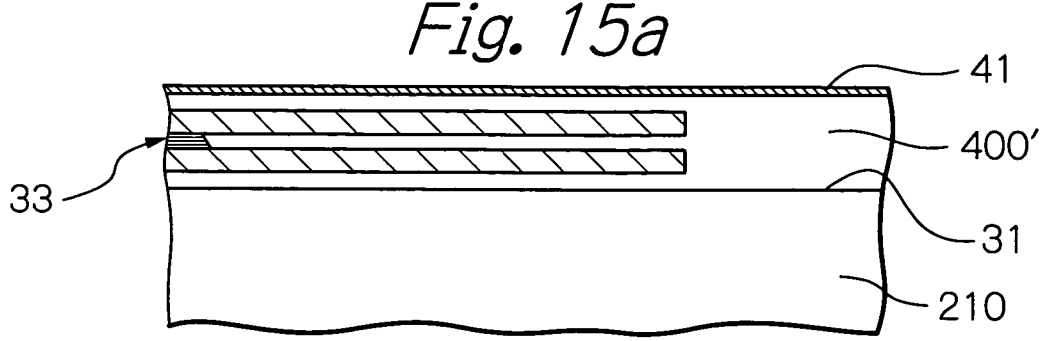
FIGS. 15a to 15d show cross-sectional views explaining an embodiment of the manufacturing process of the cavity in the third embodiment of the thin-film magnetic head according to the present invention.

As shown in FIG. 15a, first, the MR effect element 33 is formed above/on the element-formed surface 31 of the slider substrate 210. Next, after a dielectric film made of such as $Al_2O_3$ is deposited, a first overcoat layer 400' is formed by planarizing the dielectric film by means of, for example, a CMP. Then, a stop film 41 is formed on the planarized upper surface of the first overcoat layer 400' by means of, for example, a sputtering technique.

Figure 15B:
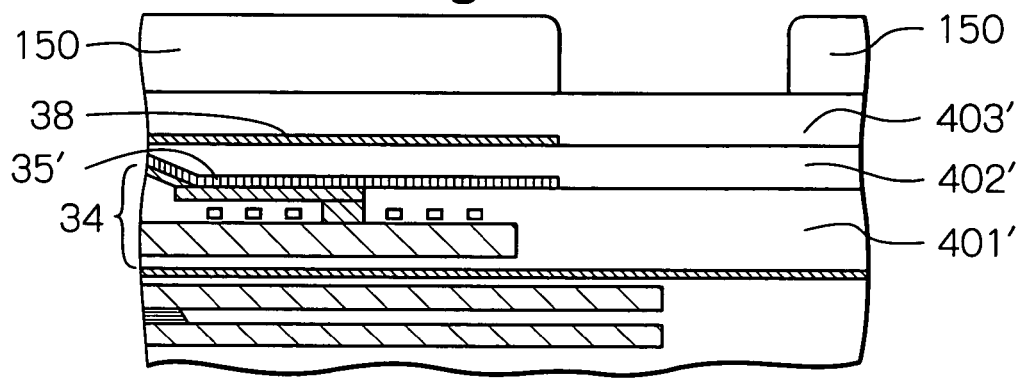

Then, as shown in FIG. 15b, an electromagnetic coil element 34, a second overcoat layer 401', an NFL-generating layer 35', a third overcoat layer 402', a reflective layer 38 and a fourth overcoat layer 403' are sequentially formed, and then, a resist pattern 150 is formed on the planarized upper surface of the fourth overcoat layer 403'.

Figure 15C:
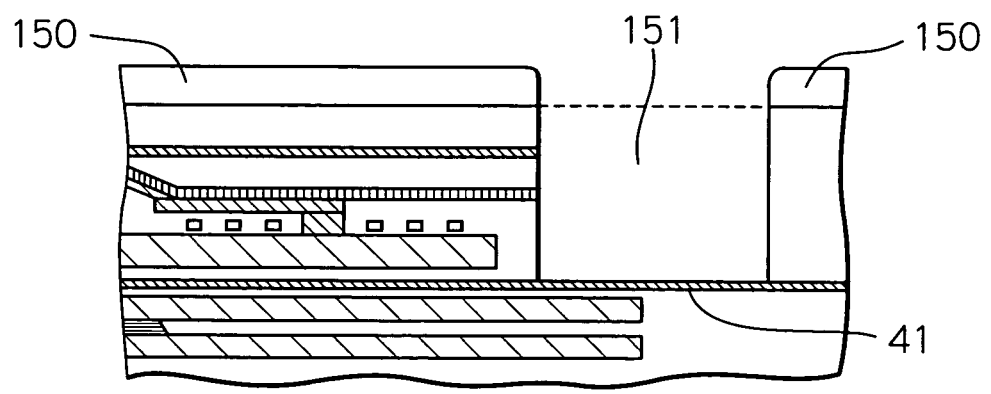

Then, as shown in FIG. 15c, a concave portion 151 is formed by means of, for example, a wet etching or a reactive ion etching (RIE). In the etching, the end point of etching becomes a position of the stop layer formed of material with a much low etching rate, and the bottom surface formed by the etching becomes the exposed surface of the stop layer 41.

After the thin-film process that includes the above-described steps is finished, a wafer substrate as the slider substrate is cut into a plurality of row bars in which a plurality of the magnetic head elements is aligned. Then, an MR height process is performed to obtain a desired MR height by rapping the row bar. After that, the row bar that underwent the MR height process is cut to be separated into a plurality of sliders (thin-film magnetic heads), and the manufacturing process of the thin-film magnetic head is completed.

Figure 15D:
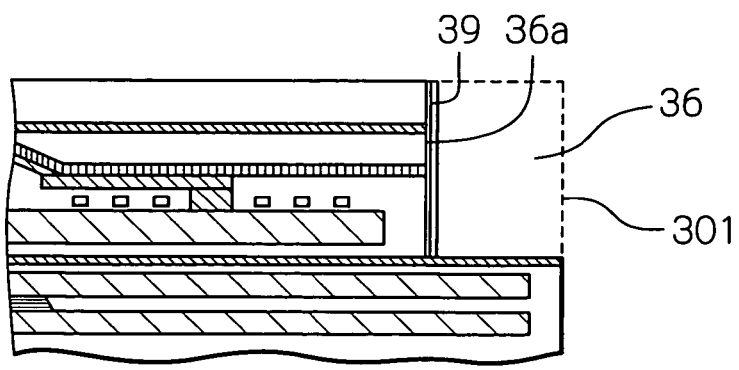

Here, as shown in FIG. 15d, a cavity 36 having a light-received wall surface 36a recessed from the head end surface 301 toward the NFL-generating layer 35' is formed by the above-described step of cutting into the row bars under the condition that cut lines are set so as to cross the concave portion 151. Further, after the cavity 36 is formed and the row bar is set into a deposition system, an antireflective film 39 may be formed on the light-received wall surface 36a by, for example, an ion-assisted evaporation technique.

Further, as an alternative of forming the concave portion 151, first, a predetermined concave is formed after the formation of the electromagnetic coil element 34 and the second overcoat layer 401', and then, the region above the concave is made as a space in respective steps of the formation of the NFL-generating layer 35' and the third overcoat layer 402', and the formation of the reflective layer 38 and the fourth overcoat layer 403'.

Figure 16:
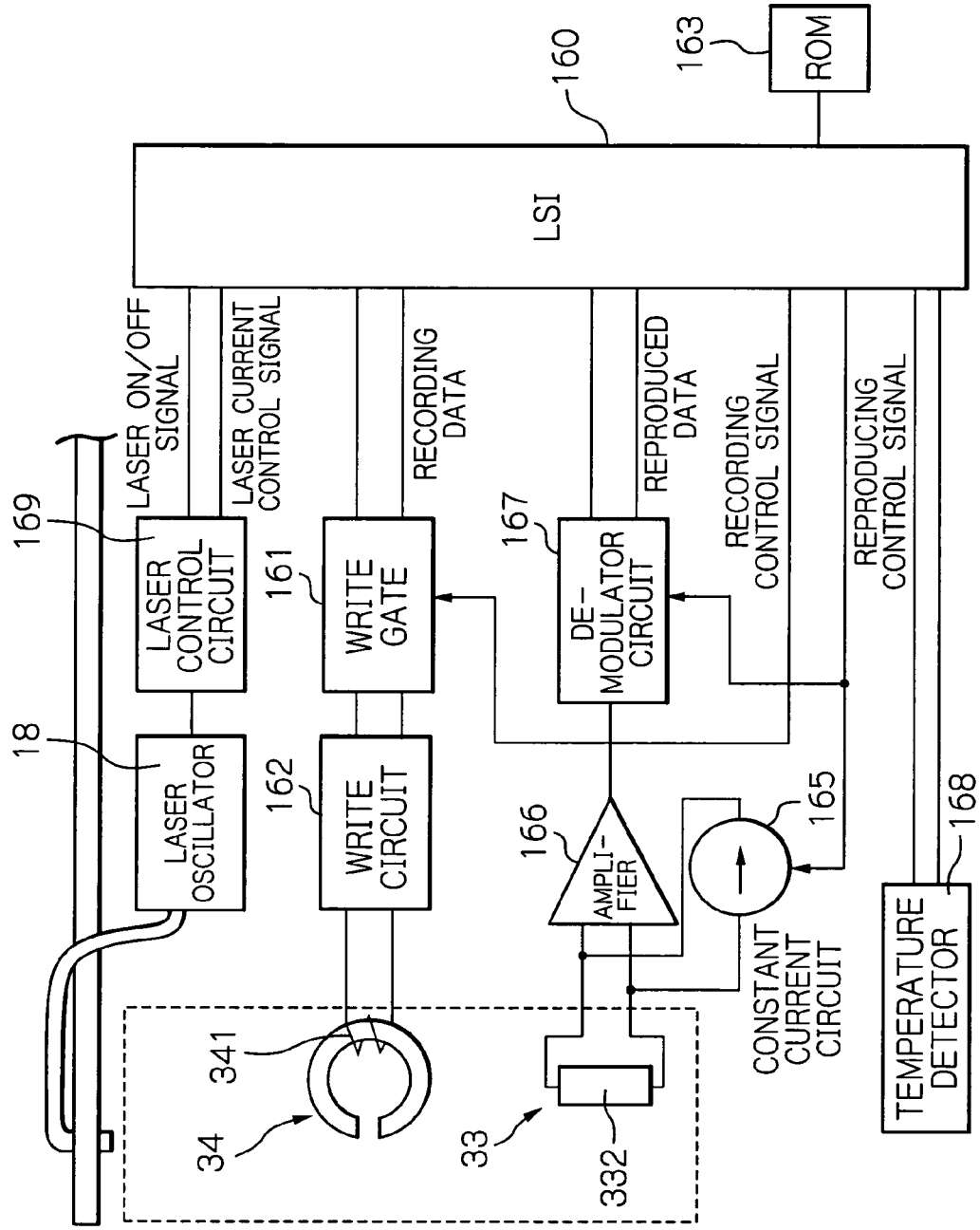
FIG. 16 shows a block diagram illustrating the circuit structure of the recording/reproducing and light-emission control circuit of the magnetic disk drive apparatus shown in FIG. 1.

FIG. 16 shows a block diagram illustrating the circuit structure of the recording/reproducing and light-emission control circuit 13 of the magnetic disk drive apparatus shown in FIG. 1.

In FIG. 16, reference numeral 160 indicates a control LSI, 161 indicates a write gate that receives recording data from the control LSI 160, 162 indicates a write circuit, 163 indicates a ROM that stores a control table and so on for controlling current values to the semiconductor laser oscillator 18, 165 indicates a constant current circuit that supplies sense currents to the MR effect element 33, 166 indicates an amplifier that amplifies the output voltage from the MR effect element 33, 167 indicates a demodulator circuit that outputs reproduced data to the control LSI 160, 168 indicates a temperature detector, and 169 indicates a laser control circuit for controlling the semiconductor laser oscillator 18, respectively.

The recording data that is output from the control LSI 160 is supplied to the write gate 161. The write gate 161 supplies recording data to the write circuit 162 only when a recording control signal that is output from the control LSI 160 instructs a write operation. The write circuit 162 passes write currents corresponding to this recording data through the write coil layer 341, and the electromagnetic coil element 34 writes data on the magnetic disk.

Constant currents flow from the constant current circuit 165 into the MR multilayer 332 only when the reproducing control signal that is output from the control LSI 160 instructs a read operation. The signal reproduced by this MR effect element 33 is amplified by the amplifier 166, demodulated by the demodulator circuit 167, and then, the obtained reproduced data is output to the control LSI 160.

The laser control circuit 169 receives a laser ON/OFF signal and a laser current control signal that are output from the control LSI 160. When the laser ON/OFF signal is an ON operation instruction, a current of a lasing threshold value or more flows into the semiconductor laser oscillator 18. The current value in this case is controlled to a value corresponding to the laser current control signal.

The control LSI 160 generates the laser ON/OFF signals by adjusting timing according to the write and read operations, and determines the value of the laser current control signals by referring the measured temperature values of the recording layer or the oscillator 18 with the temperature detector 168 and following the control table in the ROM 163. The control table includes data about the relation between the laser current value and the mount of temperature increase by heat-assisting in the recording layer, and data about the temperature independence of the coercive force, as well as the temperature dependence of the lasing threshold and the output vs. current characteristics of the laser oscillator. Thus, it is possible to realize not only a current application to the laser oscillator linked with the write and read operations but also a more diversified current application mode by providing the system of the laser ON/OFF signal and the laser current control signal independently from the recording/reproducing control signal system.

It is obvious that the circuit structure of the recording/reproducing and light-emission control circuit 13 is not limited to that shown in FIG. 16. It is also possible to specify the write and read operations using a signal other than a recording control signal and reproducing control signal. Furthermore, it is desirable to supply the laser oscillator 18 with powers at least during the write operation or just before the write operation, but it is also possible to supply the laser oscillator 18 with powers continuously during a predetermined period in which read and write operations continue.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
   a substrate having an opposed-to-medium surface and an element-formed surface perpendicular to said opposed-to-medium surface;
   an electromagnetic coil element for writing data signals, formed on/above said element-formed surface, and having a main magnetic pole layer, an auxiliary magnetic pole layer and a write coil layer; and
   at least one near-field-light-generating layer for heating a part of a magnetic medium during write operation by generating a near-field light, formed of a material including free electrons,
   said at least one near-field-light-generating layer having a shape tapered toward a head end surface on the opposed-to-medium surface side, and comprising a near-field-light-generating portion having a light-received surface and a tip reaching the head end surface on the opposed-to-medium surface side; and
   a first reflective portion having a first reflecting surface parallel to said element-formed surface, and positioned on an opposite side to said opposed-to-medium surface in relation to said near-field-light-generating portion, said light-received surface and said first reflecting surface being covered with an overcoat layer formed of a dielectric material,
   said light-received surface being sloped in respect to said element-formed surface in the form that a portion in the head end surface side of said light-received surface is lifted up or held down, and being provided in a position where an incident light propagating from a head end surface opposite to said opposed-to-medium surface through the dielectric material can reach at least a part of said light-received surface, enter the material including free electrons from said light-received surface, and force the free electrons to be oscillated uniformly to excite plasmon, and said main magnetic pole layer and said near-field-light-generating portion being in contact with or adjacent to each other at least at the tip of said near-field-light-generating portion.

2. The thin-film magnetic head as claimed in claim 1, wherein at least one of said at least one near-field-light-generating layer further comprises a second reflective portion that has at least one second reflecting surface with a slope angle in respect to said element-formed surface smaller than that of said light-received surface, and is positioned between said near-field-light-generating portion and said first reflective portion.

3. The thin-film magnetic head as claimed in claim 1, wherein said main magnetic pole layer is provided in a position on the opposite side to said light-received surface in relation to one of said at least one near-field-light-generating layer, and said near-field-light-generating portion and an end portion in the opposed-to-medium surface side of said main magnetic pole layer are overlapped through a dielectric layer or directly.

4. The thin-film magnetic head as claimed in claim 3, wherein said near-field-light-generating portion and said end portion of said main magnetic pole layer are sloped in respect to said element-formed surface in the form that portions in the opposed-to-medium surface side of said near-field-light-generating portion and said end portion are lifted up or pulled down.

5. The thin-film magnetic head as claimed in claim 1, wherein said main magnetic pole layer is provided in a position on the light-received surface side in relation to one of said at least one near-field-light-generating layer, and said main magnetic pole layer and the near-field-light-generating layer are in contact with or close to each other only at an end in the opposed-to-medium surface side of said main magnetic pole layer and at a tip of the near-field-light-generating layer reaching the head end surface on the opposed-to-medium surface side.

6. The thin-film magnetic head as claimed in claim 1, wherein said at least one near-field-light-generating layer is two near-field-light-generating layers, and two light-received surfaces of said two near-field-light-generating layers are sloped in respect to said element-formed surface in the form that portions in the opposed-to-medium surface side of said two light-received surfaces are lifted up and pulled down respectively, and two tips of said two near-field-light-generating layers reaching the head end surface on the opposed-to-medium surface side are in contact with or close to each other.

7. The thin-film magnetic head as claimed in claim 1, wherein said overcoat layer is further provided on said element-formed surface so as to cover said electromagnetic coil element and said at least one near-field-light-generating layer, and a region of said overcoat layer including all the light paths of an incident light propagating from the head end surface opposite to said opposed-to-medium surface to said light-received surface is formed of silicon dioxide or an oxide that consists primarily of silicon dioxide.

8. The thin-film magnetic head as claimed in claim 1, wherein said overcoat layer is further provided on said element-formed surface so as to cover said electromagnetic coil element and said at least one near-field-light-generating layer, and a thermal protrusion layer made of a material having a larger coefficient of thermal expansion than that of said overcoat layer is provided close to said near-field-light-generating portion.

9. The thin-film magnetic head as claimed in claim 8, wherein said main magnetic pole layer is provided in a position on the light-received surface side in relation to one of said at least one near-field-light-generating layer, and said main magnetic pole layer and the near-field-light-generating layer are in contact with or close to each other only at an end in said opposed-to-medium surface side of said main magnetic pole layer and at a tip of the near-field -light-generating layer reaching the head end surface on the opposed-to-medium surface side, and said thermal protrusion layer is positioned on the opposite side to said main magnetic pole layer in relation to said near-field-light-generating portion.

10. The thin-film magnetic head as claimed in claim 8, wherein said material of which said thermal protrusion layer is made is a non-magnetic metal.

11. The thin-film magnetic head as claimed in claim 1, wherein said overcoat layer is further provided on said element-formed surface so as to cover said electromagnetic coil element and said at least one near-field-light-generating layer,
a cavity is formed in a region in the opposite side to the opposed-to-medium surface of said overcoat layer and reaching the head end surface opposite to said opposed-to-medium surface, to which an end portion of an optic fiber for launching a light toward at least one near -field-light generating-layer can be inserted, and
said cavity has a light-received wall surface for receiving and allowing passage of the light from said optic fiber, said light-received wall surface recessed from the head end surface opposite to said opposed-to-medium surface toward at least one near-field-light-generating layer.

12. The thin-film magnetic head as claimed in claim 11, wherein a magnetoresistive effect element for reading data signals is further provided between said element-formed surface and said electromagnetic coil element, and a bottom surface parallel to said element-formed surface of said cavity is positioned above a region on the rear side of said magnetoresistive effect element when viewing from the opposed-to-medium surface side.

13. The thin-film magnetic head as claimed in claim 11, wherein a reflective layer is further provided on the light-received surface side of said at least one near-field-light generating-layer, having a third reflecting surface for reflecting a part of incident light that propagates across said light-received wall surface and directing the light toward said light-received surface.

14. The thin-film magnetic head as claimed in claim 13, wherein said third reflecting surface is sloped in respect to said element-formed surface so as to reflect a part of incident light that propagates obliquely across said light-received wall surface and direct the light toward said light-received surface.

15. The thin-film magnetic head as claimed in claim 11, wherein an antireflective film having a monolayer structure or a multilayered structure is formed on said light-received wall surface.

16. A head gimbal assembly comprising:
a thin-film magnetic head comprising:
a substrate having an opposed-to-medium surface and an element-formed surface perpendicular to said opposed-to-medium surface;
an electromagnetic coil element for writing data signals, formed on/above said element-formed surface, and having a main magnetic pole layer, an auxiliary magnetic pole layer and a write coil layer; and
at least one near-field-light-generating layer for heating a part of a magnetic medium during write operation by generating a near-field light, formed of a material including free electrons,
said at least one near-field-light-generating layer having a shape tapered toward a head end surface on the opposed-to-medium surface side, and comprising a near-field-light-generating portion having a light-received surface and a tip reaching the head end surface on the opposed-to-medium surface side; and
a first reflective portion having a first reflecting surface parallel to said element-formed surface, and positioned on an opposite side to said opposed-to-medium surface in relation to said near-field-light-generating portion, said light-received surface and said first reflecting surface being covered with an overcoat layer formed of a dielectric material,
said light-received surface being sloped in respect to said element-formed surface in the form that a portion in the head end surface side of said light-received surface is lifted up or held down, and being provided in a position where an incident light propagating from a head end surface opposite to said opposed-to-medium surface through the dielectric material can reach at least a part of said light-received surface, enter the material including free electrons from said light-received surface, and force the free electrons to be oscillated uniformly to excite plasmon, and
said main magnetic pole layer and said near-field-light-generating portion being in contact with or adjacent to each other at least at the tip of said near-field-light-generating portion;
a support mechanism for supporting said thin-film magnetic head;
trace conductors for said electromagnetic coil element;
trace conductors for a magnetoresistive effect element when said thin-film magnetic head comprises said magnetoresistive effect element; and
an optic fiber for launching a light that propagates across the head end surface opposite to said opposed-to-medium surface.

17. The head gimbal assembly as claimed in claim 16, wherein at least one of said at least one near-field-light-generating layer further comprises a second reflective portion that has at least one second reflecting surface with a slope angle in respect to said element-formed surface smaller than that of said light-received surface, and is positioned between said near-field-light-generating portion and said first reflective portion.

18. The head gimbal assembly as claimed in claim 16, wherein said main magnetic pole layer is provided in a position on the opposite side to said light-received surface in relation to one of said at least one near-field-light-generating layer, and said near-field-light-generating portion and an end portion in the opposed-to-medium surface side of said main magnetic pole layer are overlapped through a dielectric layer or directly.

19. The head gimbal assembly as claimed in claim 18, wherein said near-field -light-generating portion and said end portion of said main magnetic pole layer are sloped in respect to said element-formed surface in the form that portions in the opposed-to-medium surface side of said near-field-light-generating portion and said end portion are lifted up or pulled down.

20. The head gimbal assembly as claimed in claim 16, wherein said main magnetic pole layer is provided in a position on the light-received surface side in relation to one of said at least one near-field-light-generating layer, and said main magnetic pole layer and the near-field-light-generating layer are in contact with or close to each other only at an end in the opposed-to-medium surface side of said main magnetic pole layer and at a tip of the near-field-light-generating layer reaching the head end surface on the opposed-to-medium surface side.

21. The head gimbal assembly as claimed in claim 16, wherein said at least one near-field-light-generating layer is two near-field-light-generating layers, and two light-received surfaces of said two near-field-light-generating layers are sloped in respect to said element-formed surface in the form that portions in the opposed-to-medium surface side of said two light-received surfaces are lifted up and pulled down respectively, and two tips of said two near-field-light-generating layers reaching the head end surface on the opposed-to-medium surface side are in contact with or close to each other.

22. The head gimbal assembly as claimed in claim 16, wherein said overcoat layer is further provided on said element-formed surface so as to cover said electromagnetic coil element and said at least one near-field-light-generating layer, and a region of said overcoat layer including all the light paths of an incident light propagating from the head end surface opposite to said opposed-to-medium surface to said light-received surface is formed of silicon dioxide or an oxide that consists primarily of silicon dioxide.

23. The head gimbal assembly as claimed in claim 16, wherein said overcoat layer is further provided on said element-formed surface so as to cover said electromagnetic coil element and said at least one near-field-light-generating layer, and a thermal protrusion layer made of a material having a larger coefficient of thermal expansion than that of said overcoat layer is provided close to said near-field-light-generating portion.

24. The head gimbal assembly as claimed in claim 23, wherein said main magnetic pole layer is provided in a position on the light-received surface side in relation to one of said at least one near-field-light-generating layer, and said main magnetic pole layer and the near-field-light-generating layer are in contact with or close to each other only at an end in said opposed-to-medium surface side of said main magnetic pole layer and at a tip of the near-field-light-generating layer reaching the head end surface on the opposed-to-medium surface side, and said thermal protrusion layer is positioned on the opposite side to said main magnetic pole layer in relation to said near-field-light-generating portion.

25. The head gimbal assembly as claimed in claim 23, wherein said material of which said thermal protrusion layer is made is a non-magnetic metal.

26. The head gimbal assembly as claimed in claim 16, wherein said overcoat layer is further provided on said element-formed surface so as to cover said electromagnetic coil element and said at least one near-field-light-generating layer,
  a cavity is formed in a region in the opposite side to the opposed-to-medium surface of said overcoat layer and reaching the head end surface opposite to said opposed-to-medium surface, to which an end portion of an optic fiber for launching a light toward at least one near-field-light generating-layer can be inserted, and
  said cavity has a light-received wall surface for receiving and allowing passage of the light from said optic fiber, said light-received wall surface recessed from the head end surface opposite to said opposed-to-medium surface toward at least one near-field-light-generating layer.

27. The head gimbal assembly as claimed in claim 26, wherein a magnetoresistive effect element for reading data signals is further provided between said element-formed surface and said electromagnetic coil element, and a bottom surface parallel to said element-formed surface of said cavity is positioned above a region on the rear side of said magnetoresistive effect element when viewing from the opposed-to-medium surface side.

28. The head gimbal assembly as claimed in claim 26, wherein a reflective layer is further provided on the light-received surface side of said at least one near-field-light generating-layer, having a third reflecting surface for reflecting a part of incident light that propagates across said light-received wall surface and directing the light toward said light-received surface.

29. The head gimbal assembly as claimed in claim 28, wherein said third reflecting surface is sloped in respect to said element-formed surface so as to reflect a part of incident light that propagates obliquely across said light-received wall surface and direct the light toward said light-received surface.

30. The head gimbal assembly as claimed in claim 26, wherein an antireflective film having a monolayer structure or a multilayered structure is formed on said light-received wall surface.

31. A magnetic disk drive apparatus comprising:
  at least one head gimbal assembly comprising:
  a thin-film magnetic head comprising:
    a substrate having an opposed-to-medium surface and an element-formed surface perpendicular to said opposed-to-medium surface;
    an electromagnetic coil element for writing data signals, formed on/above said element-formed surface, and having a main magnetic pole layer, an auxiliary magnetic pole layer and a write coil layer; and
    at least one near-field-light-generating layer for heating a part of a magnetic medium during write operation by generating a near-field light, formed of a material including free electrons,
    said at least one near-field-light-generating layer having a shape tapered toward a head end surface on the opposed-to-medium surface side, and comprising a near-field-light-generating portion having a light-received surface and a tip reaching the head end surface on the opposed-to-medium surface side; and
    a first reflective portion having a first reflecting surface parallel to said element-formed surface, and positioned on an opposite side to said opposed-to-medium surface in relation to said near-field-light-generating portion, said light-received surface and said first reflecting surface being covered with an overcoat layer formed of a dielectric material,
    said light-received surface being sloped in respect to said element-formed surface in the form that a portion in the head end surface side of said light-received surface is lifted up or held down, and being provided in a position where an incident light propagating from a head end surface opposite to said opposed-to-medium surface through the dielectric material can reach at least a part of said light-received surface, enter the material including free electrons from said light-received surface, and force the free electrons to be oscillated uniformly to excite plasmon, and
    said main magnetic pole layer and said near-field-light-generating portion being in contact with or adjacent to each other at least at the tip of said near-field-light-generating portion;
  a support mechanism for supporting said thin-film magnetic head;
  trace conductors for said electromagnetic coil element;
  trace conductors for a magnetoresistive effect element when said thin-film magnetic head comprises said magnetoresistive effect element; and an optic fiber for launching a light that propagates across the head end surface opposite to said opposed-to-medium surface;
at least one magnetic disk;
a light source for providing the light to said optic fiber; and
a recording/reproducing and light-emission control means for controlling read and write operations of said thin-film magnetic head to said at least one magnetic disk and for controlling an emitting operation of said light source.

32. The magnetic disk drive apparatus as claimed in claim 31, wherein at least one of said at least one near-field-light-generating layer further comprises a second reflective portion that has at least one second reflecting surface with a slope angle in respect to said element-formed surface smaller than that of said light-received surface, and is positioned between said near-field-light-generating portion and said first reflective portion.

33. The magnetic disk drive apparatus as claimed in claim 31, wherein said main magnetic pole layer is provided in a position on the opposite side to said light-received surface in relation to one of said at least one near-field-light-generating layer, and said near-field-light -generating portion and an end portion in the opposed-to-medium surface side of said main magnetic pole layer are overlapped through a dielectric layer or directly.

34. The magnetic disk drive apparatus as claimed in claim 33, wherein said near -field-light-generating portion and said end portion of said main magnetic pole layer are sloped in respect to said element-formed surface in the form that portions in the opposed-to-medium surface side of said near-field-light-generating portion and said end portion are lifted up or pulled down.

35. The magnetic disk drive apparatus as claimed in claim 31, wherein said main magnetic pole layer is provided in a position on the light-received surface side in relation to one of said at least one near-field-light-generating layer, and said main magnetic pole layer and the near-field-light-generating layer are in contact with or close to each other only at an end in the opposed-to-medium surface side of said main magnetic pole layer and at a tip of the near -field-light-generating layer reaching the head end surface on the opposed-to-medium surface side.

36. The magnetic disk drive apparatus as claimed in claim 31, wherein said at least one near-field-light-generating layer is two near-field-light-generating layers, and two light -received surfaces of said two near-field-light-generating layers are sloped in respect to said element-formed surface in the form that portions in the opposed-to-medium surface side of said two light-received surfaces are lifted up and pulled down respectively, and two tips of said two near-field-light-generating layers reaching the head end surface on the opposed-to-medium surface side are in contact with or close to each other.

37. The magnetic disk drive apparatus as claimed in claim 31, wherein said overcoat layer is further provided on said element-formed surface so as to cover said electromagnetic coil element and said at least one near-field-light-generating layer, and a region of said overcoat layer including all the light paths of an incident light propagating from the head end surface opposite to said opposed-to-medium surface to said light-received surface is formed of silicon dioxide or an oxide that consists primarily of silicon dioxide.

38. The magnetic disk drive apparatus as claimed in claim 31, wherein said overcoat layer is further provided on said element-formed surface so as to cover said electromagnetic coil element and said at least one near-field-light-generating layer, and a thermal protrusion layer made of a material having a larger coefficient of thermal expansion than that of said overcoat layer is provided close to said near-field-light-generating portion.

39. The magnetic disk drive apparatus as claimed in claim 38, wherein said main magnetic pole layer is provided in a position on the light-received surface side in relation to one of said at least one near-field-light-generating layer, and said main magnetic pole layer and the near-field-light-generating layer are in contact with or close to each other only at an end in said opposed-to-medium surface side of said main magnetic pole layer and at a tip of the near -field-light-generating layer reaching the head end surface on the opposed-to-medium surface side, and said thermal protrusion layer is positioned on the opposite side to said main magnetic pole layer in relation to said near-field-light-generating portion.

40. The magnetic disk drive apparatus as claimed in claim 38, wherein said material of which said thermal protrusion layer is made is a non-magnetic metal.

41. The magnetic disk drive apparatus as claimed in claim 31, wherein said overcoat layer is further provided on said element-formed surface so as to cover said electromagnetic coil element and said at least one near-field-light-generating layer,
a cavity is formed in a region in the opposite side to the opposed-to-medium surface of said overcoat layer and reaching the head end surface opposite to said opposed-to-medium surface, to which an end portion of an optic fiber for launching a light toward at least one near -field-light generating-layer can be inserted, and
said cavity has a light-received wall surface for receiving and allowing passage of the light from said optic fiber, said light-received wall surface recessed from the head end surface opposite to said opposed-to-medium surface toward at least one near-field-light-generating layer.

42. The magnetic disk drive apparatus as claimed in claim 41, wherein a magnetoresistive effect element for reading data signals is further provided between said element-formed surface and said electromagnetic coil element, and a bottom surface parallel to said element-formed surface of said cavity is positioned above a region on the rear side of said magnetoresistive effect element when viewing from the opposed-to-medium surface side.

43. The magnetic disk drive apparatus as claimed in claim 41, wherein a reflective layer is further provided on the light-received surface side of said at least one near -field-light generating-layer, having a third reflecting surface for reflecting a part of incident light that propagates across said light-received wall surface and directing the light toward said light -received surface.

44. The magnetic disk drive apparatus as claimed in claim 43, wherein said third reflecting surface is sloped in respect to said element-formed surface so as to reflect a part of incident light that propagates obliquely across said light-received wall surface and direct the light toward said light-received surface.

45. The magnetic disk drive apparatus as claimed in claim 41, wherein an antireflective film having a monolayer structure or a multilayered structure is formed on said light-received wall surface.

* * * * *